(12) United States Patent
Losacco et al.

(10) Patent No.: US 8,812,590 B2
(45) Date of Patent: Aug. 19, 2014

(54) ASSET SHARING WITHIN AN ENTERPRISE USING A PEER-TO-PEER NETWORK

(75) Inventors: Vito Losacco, Rome (IT); Andrzej Nazaruk, Warsaw (PL); Mahesh Viswanathan, Yorktown Heights, NY (US); Maciej Wielgus, Gliwice (PL)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 13/097,203

(22) Filed: Apr. 29, 2011

(65) Prior Publication Data
US 2012/0278386 A1    Nov. 1, 2012

(51) Int. Cl.
G06F 15/16    (2006.01)

(52) U.S. Cl.
USPC .......................................... 709/204; 709/203

(58) Field of Classification Search
USPC ........................................................ 709/204
See application file for complete search history.

(56) References Cited

U.S. PATENT DOCUMENTS

| | | | |
|---|---|---|---|
| 7,200,563 B1 * | 4/2007 | Hammitt et al. | 705/7.11 |
| 7,478,120 B1 * | 1/2009 | Zhang | 709/201 |
| 7,613,770 B2 * | 11/2009 | Li | 709/203 |
| 7,782,866 B1 | 8/2010 | Walsh et al. | |
| 7,783,777 B1 | 8/2010 | Pabla et al. | |
| 2003/0041141 A1 * | 2/2003 | Abdelaziz et al. | 709/223 |
| 2003/0050966 A1 * | 3/2003 | Dutta et al. | 709/203 |
| 2003/0177481 A1 * | 9/2003 | Amaru et al. | 717/148 |
| 2004/0044727 A1 | 3/2004 | Abdelaziz et al. | |
| 2004/0193607 A1 * | 9/2004 | Kudo et al. | 707/9 |
| 2004/0230636 A1 * | 11/2004 | Masuoka et al. | 708/800 |
| 2006/0090067 A1 * | 4/2006 | Edmonds et al. | 713/159 |
| 2010/0198888 A1 | 8/2010 | Blomstedt et al. | |
| 2010/0211608 A1 | 8/2010 | Dolganow et al. | |
| 2010/0299522 A1 * | 11/2010 | Khambete | 713/168 |

FOREIGN PATENT DOCUMENTS

WO    WO 2006025061    3/2006

OTHER PUBLICATIONS

BitTorrent (protocol) [online]. [retrieved on 1Jan. 17, 2011]. Retrieved from the Internet <URL: http://en.wikipedia.org/wiki/BitTorrent_%28protocol%29>, pp. 1-13.

S. Osokine, Search Optimization in the Distributed Networks [online]. Oct. 15, 2002 [retrieved on Jan. 17, 2011]. Retrieved from the Internet <URL: http://www.grouter.net/gnutella/search.htm>, pp. 1-65.

(Continued)

Primary Examiner — Minh-Chau Nguyen
(74) Attorney, Agent, or Firm — Schmeiser, Olsen & Watts; John Pivnichny

(57) ABSTRACT

A method and system for sharing an asset in a peer-to-peer network. Meta data and a source node identification are received. The meta data specifies properties and content of the asset to be shared by the source node. The received source node identification and the meta data are locally stored as a couple in a catalog. Subsequently, content specifying the asset and a request to search for and retrieve the asset based on the content is received. The locally stored catalog is loaded and searched to detect the couple that includes the source node identification and meta data, where the received content matches the meta data. The source node is identified based on the detected couple. A request is sent to the source node to retrieve and share the asset, and in response, the asset is received.

20 Claims, 10 Drawing Sheets

(56) References Cited

OTHER PUBLICATIONS

Owl Web Ontology Language Guide, W3C Recommendation Feb. 10, 2004, [online]. W3C (MIT , ERCIM, Keio) 2004 [retrieved on Jan. 17, 2011]. Retrieved from Internet <URL: http:www.w3.org/TR/owl-guide/>, pp. 1-42.

Gnutella [online]. [retrieved on Jan. 17, 2011]. Retrieved from the Internet <URL: http://en.wikipedia.org/wiki/Gnutella>, pp. 1-7.

Gnutella2 [online]. [retrieved on Jan. 17, 2011]. Retrieved from the Internet <URL: http://en.wikipedia.org/wiki/Gnutella2>, pp. 1-5.

Heddle et al., Peer-to-Peer Discovery: A Key to Enabling Robust, Interoperable C2 Architectures Sparta, Inc., 2005 International Command and Control Research Technology Symposium the Future of Command and Control, , Mar. 15, 2005, 13 pages.

Peer-to-peer file sharing [online]. [retrieved on Jan. 17, 2011]. Retrieved from the Internet <URL: http://en.wikipedia.org/wikiP2P_file_sharing>, pp. 1-5.

eDonkey2000 [online]. [retrieved on Jan. 17, 2011]. Retrieved from the Internet <URL: http://en.wikipedia.org/wiki/EDonkey2000>, pp. 1-3.

Peer-to-peer systems [online] Hewlett-Packard Development Company, L.P. 2009 [retrieved on Sep. 2, 2012]. Retrieved from the Internet <URL: http://www.hpl.hp.com/research/p2p/index.html>, 1 page.

Risse et al., P2P Evolution: From File-sharing to Decentralized Workflows, Information Technology 46(2004) 4 Oldenbourg Verlag, pp. 193-199.

Tran et al., A Trust based Access Control Framework for P2P File-Sharing Systems, Proceedings of the 38th Hawaii International Conference on System Sciences—2005, 2005 IEEE, pp. 1-10.

Kantere et al., A Framework for Semantic Grouping in P2P Databases, Information Systems vol. 33 issues 7-8 Nov.-Dec. 2008, 34 pages.

Kazaa [online]. [retrieved on Jan. 17, 2011]. Retrieved from the Internet <URL: http://en.wikipedia.org/wiki/Kazaa>, pp. 1-5.

Ahuja et al., PSON: A scalable Peer-toPeer File Sharing System Supporting Complex Queries, UCONN CSE Technical Report: UbiNet-TR05-01, Last Update: Jul. 2005, pp. 1-25.

Lv et al., Can Heterogeneity Make Gnutella Scalable?, Proceedings of the first International Workshop on Peer-to-Peer Systems (IPTPS) 2002, 6 pages.

Davoust et al., Towards Semantically Enhanced File-Sharing, Journal of Software, vol. 4, No. 8, Oct. 2009 Academy Publisher 2009, pp. 787-797.

* cited by examiner

ASSET SHARING WITHIN AN ENTERPRISE USING A PEER-TO-PEER NETWORK

TECHNICAL FIELD

The present invention relates to a data processing method and system for managing information in a peer-to-peer network, and more particularly to a technique for managing asset sharing and retrieval in a peer-to-peer network.

BACKGROUND

Known asset sharing infrastructures allow pieces of work (e.g., patterns, reference models, write-ups, templates, submitted proposals, etc.) in an enterprise to be reused. Being based on a centralized database architecture, the known asset sharing infrastructures require a dedicated maintenance process that includes activities such as backups, provisioning of new disk space, etc. Moreover, a validation and review process has been put in place in the known asset sharing infrastructures to limit the upload of assets. Because asset uploads are limited, a substantial amount of assets, including extremely useful partial pieces of work, reside on the hard disk drives of personal computers without any chance of being shared with and leveraged by others in the enterprise. Thus, there exists a need to overcome at least one of the preceding deficiencies and limitations of the related art.

BRIEF SUMMARY

Embodiments of the present invention provide a method of sharing an asset in a peer-to-peer network. The method comprises:

a computer receiving meta data that specifies an asset to be shared by a source node in a peer-to-peer network and receiving an identification of the source node, wherein the computer and the source node are included in a plurality of nodes of the peer-to-peer network;

the computer locally storing the received identification of the source node and the received meta data as a couple in a list residing in a computer data storage device local to the computer, wherein the list includes identifications of source nodes and meta data corresponding to the source nodes;

subsequent to locally storing the received identification of the source node and the received meta data, the computer receiving content specifying the asset and a request to search for and retrieve the asset based on the content;

the computer loading the list that includes the identifications of source nodes and meta data corresponding to the source nodes;

the computer searching through the list and detecting the couple that includes the locally stored identification of the source node and the locally stored meta data, wherein detecting the couple includes determining a match between the content and the locally stored meta data;

the computer identifying the source node based on the detected couple that includes the locally stored identification of the source node;

the computer sending a request to the identified source node to retrieve the asset; and the computer receiving the asset in response to the request to the identified source node, wherein a result of receiving the asset is a sharing of the asset by the source node.

A system, program product and a process for supporting computing infrastructure where the process provides at least one support service are also described and claimed herein, where the system, program product and process for supporting computing infrastructure correspond to the aforementioned method.

Embodiments of the present invention provide a simplified and self-maintained asset sharing and retrieval system that improves effectiveness of an asset sharing/retrieval process (i.e., improves hit rate) and reduces network traffic by allowing a peer node to search for an asset using a locally stored catalog, rather than searching the hard disk drives of other peer nodes. Furthermore, embodiments disclosed herein provide an asset sharing system that is integrated with productivity tools, thereby allowing the sharing of assets to be managed from the time the assets are created or edited.

DETAILED DESCRIPTION

Overview

Embodiments of the present invention may provide a method and system for sharing assets within an enterprise by using a pure peer-to-peer (P2P) network. Embodiments of the present invention provide associative addressability of assets based on the content of assets, rather than the types of the assets. In one embodiment, the associative addressability of the assets is based on an ontology that codifies the content of the assets into meta data. The meta data is structured based on the ontology. In one embodiment, the asset sharing system is integrated with one or more productivity tools, such as word processing, spreadsheet, and presentation tools, thereby allowing automatic asset sharing immediately after creating or modifying an asset. Further, a first peer node may search for an asset stored at a second peer node by searching meta data that specifies characteristics of the asset, where the meta data is stored in a computer storage device that is local to the first peer node. The search for an asset that is a computer file may be based on the semantic meaning of the content of the file, rather than using the file name as a search criterion. By using locally stored meta data about assets available on the network, the searching disclosed herein may reduce common peer-to-peer distributed searching issues that existing technologies are required to carefully manage. Still further, a decentralized architecture disclosed herein for embodiments of the asset sharing system avoids the need for external maintenance.

As used herein, an asset is defined as an artifact that provides a solution to a specific business problem. As used herein, an artifact is defined as a computer file, object, or other piece of data that is created or used during the implementation of a process, and that is stored in an electronic digital format. Examples of assets include word processing documents, presentation files created by a presentation program, information technology architectural documents, binary executable files, source files and scripts. In one embodiment, an asset is a binary large object (BLOB).

Asset Sharing System

Figure 1:
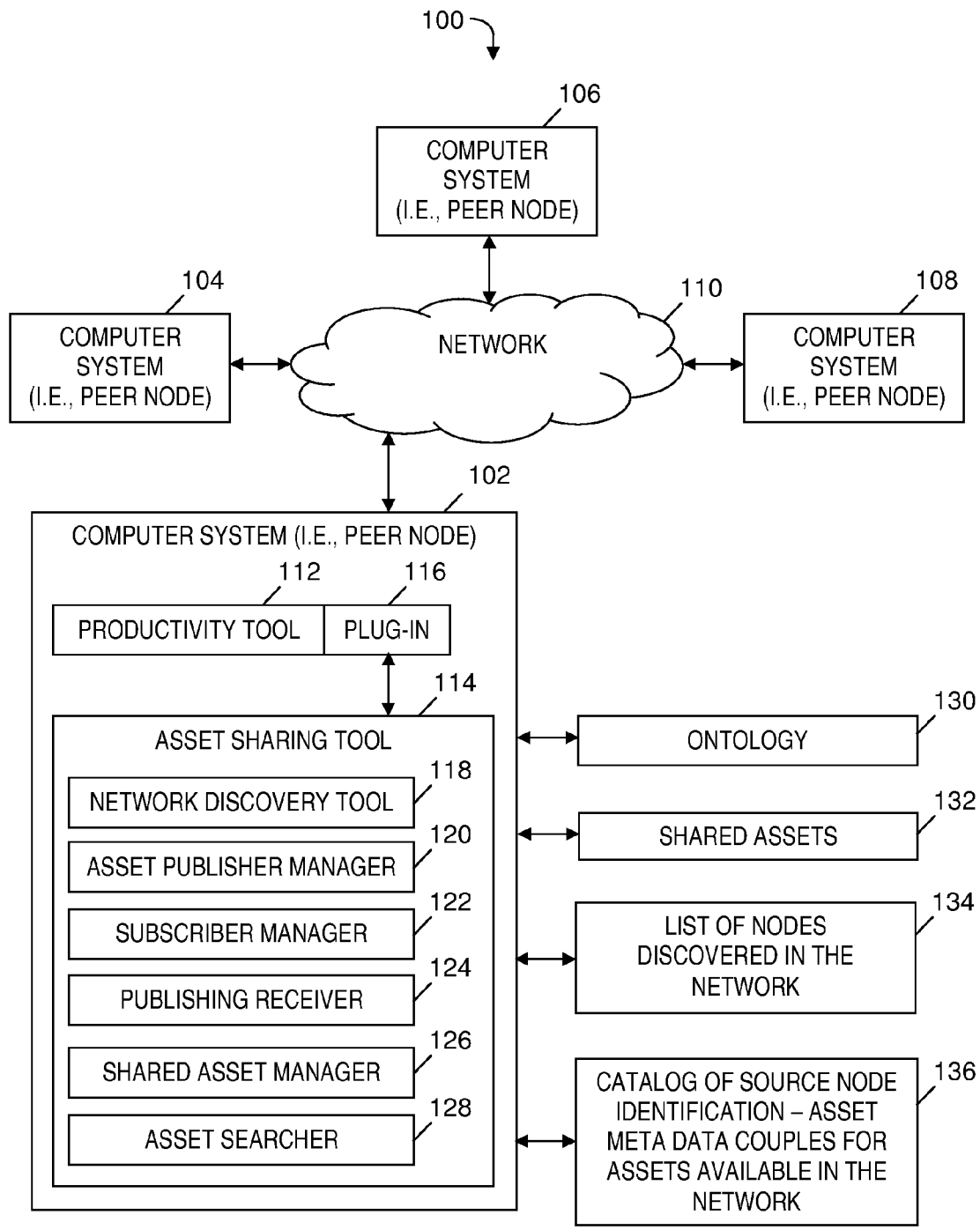
FIG. 1 is a block diagram of a system that includes an asset sharing tool for sharing and retrieving an asset in a peer-to-peer network, in accordance with embodiments of the present invention.

FIG. 1 is a block diagram of a system that includes an asset sharing tool for sharing and retrieving an asset in a peer-to-peer network, in accordance with embodiments of the present invention. A system 100 includes computer systems 102, 104, 106 and 108 (i.e., peer nodes) that communicate via pure peer-to-peer networking via a network 110. Each peer node in system 100 may make a portion of their computer data storage available to other peer nodes. System 100 does not include a central server or a central router. Although system 100 includes four peer nodes, the present invention contemplates system 100 as including any plurality of peer nodes.

Computer system 102 runs a software-based productivity tool 112 (e.g., a word processing, spreadsheet or presentation software tool), a software-based asset sharing tool 114 and a software-based plug-in 116 that is associated with productivity tool 112. Plug-in 116 runs to implement asset sharing tool 114. Asset sharing tool 114 includes the following software modules: a network discovery tool 118, an asset publisher manager 120, a subscriber manager 122, a publishing receiver 124, a shared asset manager 126 and an asset searcher 128. Computer system 102 accesses one or more computer data storage devices (not shown) to access an ontology 130, shared assets 132, a list of peer nodes 134 discovered in network 110, and a catalog 136 of couples (i.e., pairs), each couple including an identification of a source peer node and meta data. The identification of the source peer node may include an address of a computer system that locally stores (i.e., is the source of) an asset that is available to be shared with other peer nodes via network 110. The meta data specifies characteristics of the asset that is available to be shared with the other peer nodes.

Ontology 130 formally describes a conceptual schema that represents a managed assets domain, thereby allowing an appropriate classification of each asset that is available to be shared. Ontology 130 also allows the leveraging of reasoning tools to accomplish searches such as "I am looking for an operational model of a J2EE® application, with HTTP servers running either Linux® Ubuntu® on System X® or Linux® Red Hat only on BladeCenter®." J2EE® is a platform for server programming in the Java programming language provided by Sun Microsystems, Inc., which has been acquired by Oracle Corporation located in Redwood Shores, Calif. Linux® is an operating system developed by Linus Torvalds. Ubuntu® is an operating system provided by Canonical Ltd. located in London, United Kingdom. System X® is a server provided by International Business Machines Corporation located in Armonk, N.Y. BladeCenter® is a blade server architecture provided by International Business Machines Corporation. Ontology 130 is structured in concepts (i.e., classes of the assets domain), properties of concepts (i.e., slots), relations between concepts, instants (i.e., specific concepts), and a glossary (i.e., vocabulary). An asset is classified based on the conceptual schema using meta data provided by a user of a peer node computer system of system 100 when the user is instructing the system to make the asset available for sharing with other peer nodes.

Embodiments of the present invention use a conceptual schema to classify the asset depending upon the content of the asset itself, and not on the type of the asset. A pure ontology concept may be used to make documents content-addressable rather than using a traditional taxonomy to classify the documents. For example, a traditional taxonomy may classify movies depending upon genres, actors, directors, etc. to allow a pseudo-semantic search for movies. With the ontology disclosed herein, the movies may be classified depending upon specific situations that happen in the movie or characteristics of actors. For example, "two guys dressed in black and always wearing a hat" may classify the movie "The Blues Brothers." Further, a reasoned search may be performed to increase the likelihood of finding what is being searched for. The content-addressability of documents provided by embodiments of the present invention is based on the meta data, and not the actual content of the document. The meta data is structured based on the ontology. Therefore, the content-addressability provided by the meta data leverages the added value of the ontology and the reasoning tools, instead of relying on a traditional taxonomy.

Shared assets 132 may include asset(s) that have been previously shared with computer system 102 by another peer node in system 100. Shared assets 132 may include asset(s) created and/or edited by a user of computer system 102, where the asset(s) are made available for sharing with one or more other peer nodes in system 100.

List of nodes 134 includes identifications of nodes that are discovered by network discovery tool 118. See the discussion presented below relative to FIG. 3 for more details regarding the functionality of network discovery tool 118.

Although not shown in system 100, computer systems 104, 106 and 108 each include components that are analogous to the components shown in FIG. 1 that are included in or coupled to computer system 102. For example, computer system 104 includes a productivity tool that includes a plug-in and an asset sharing tool that includes modules analogous to modules 118, 120, 122, 124, 126 and 128.

Further details about the functionality of the components of system 100 are included in the discussions presented below relative to FIGS. 2-7, FIG. 8A, FIG. 8B and FIG. 9.

Asset Sharing Process

Figure 2:
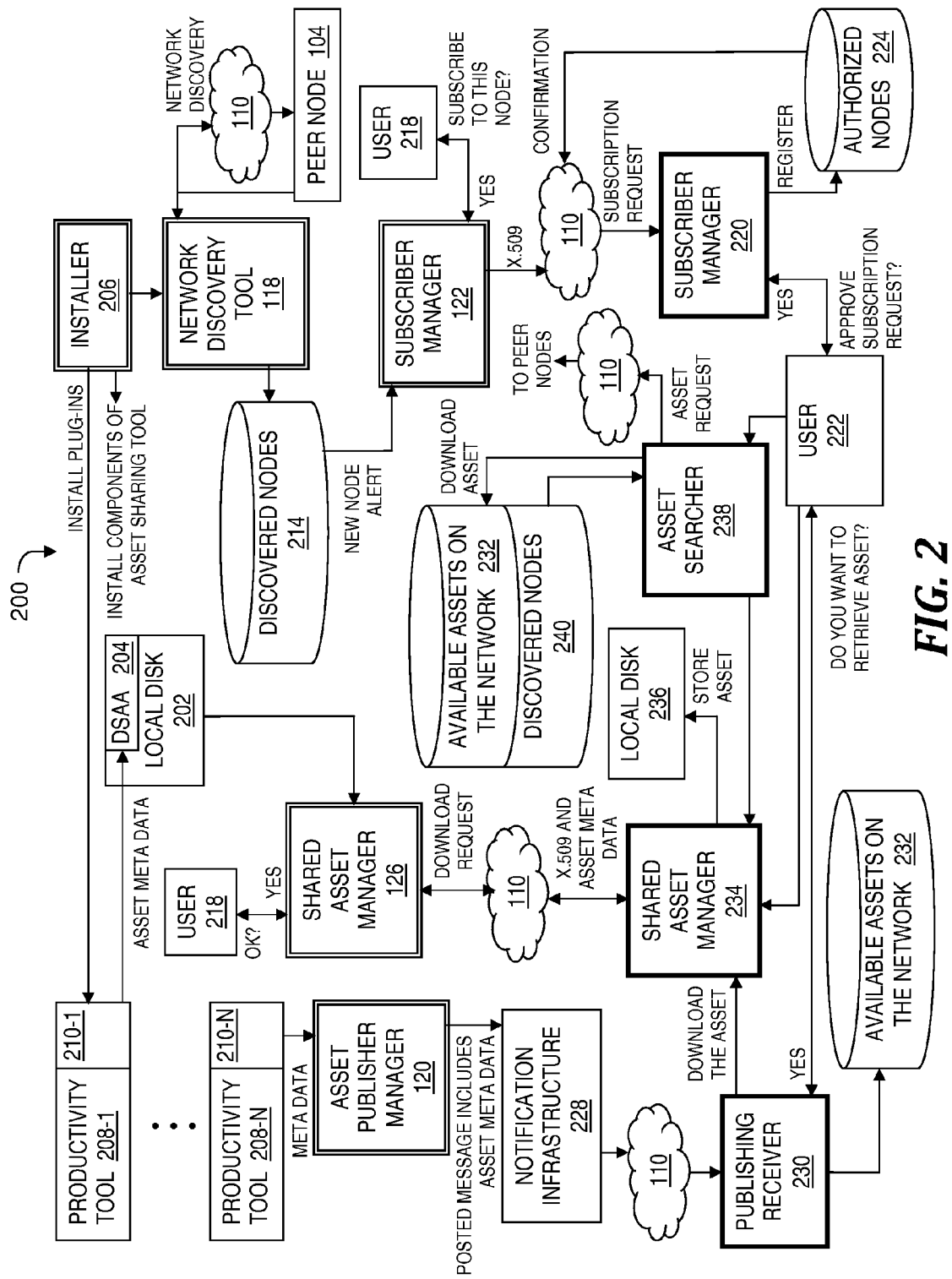
FIG. 2 is a component model and flowchart of a process of sharing and retrieving an asset, where the process is implemented in the system of FIG. 1, in accordance with embodiments of the present invention.

FIG. 2 is a component model and flowchart of a process of sharing and retrieving an asset, where the process is implemented in the system of FIG. 1, in accordance with embodiments of the present invention. The discussion of FIG. 2 presented below describes computer system 102 (see FIG. 1) as being a requester node that attempts to discover other peer nodes that are available on the network and as being a source node (i.e., the source of an asset that is being made available for sharing with other peer nodes of system 100 in FIG. 1), and further describes computer system 104 (see FIG. 1) as a requester node that requests a download of the asset that is made available for sharing by computer system 102 (see FIG. 1). The processes running on computer system 102 (see FIG. 1) are indicated in FIG. 2 by boxes having a double-lined border (see, e.g., installer 206), whereas processes running on computer system 104 (see FIG. 1) are indicated in FIG. 2 by boxes that have a thick-lined border (see, e.g., subscriber manager 220). Embodiments of the present invention, however, contemplate that any of the peer nodes in system 100 (see FIG. 1) may provide the functionality described below in the discussion of FIG. 2.

Component model and flowchart 200 includes a local disk 202. Each peer node in system 100 (see FIG. 1) creates a dedicated shared assets area (DSAA) in a computer data storage unit that is local to the peer node. For example, computer system 102 (see FIG. 1) creates DSAA 204 in local disk 202, where local disk 202 is coupled to computer system 102 (see FIG. 1). A software-based installer 206 running on computer system 102 (see FIG. 1) enables productivity software tools 112-1 . . . 112-N with asset sharing tool 114 (see FIG. 1) by installing software-based plug-ins 116-1 . . . 116-N, respectively, where N≥1. Further, installer 206 installs components of asset sharing tool 114 (see FIG. 1). Still further, installer 206 runs network discovery tool 118 that attempts to contact other peer nodes (e.g., peer node 104) to determine which peer nodes are available in network 110. Network discovery tool 118 also receives replies from one or more of the peer nodes that were contacted by the network discovery tool, thereby indicating that the one or more peer nodes are available in network 110. Furthermore, network discovery tool 118 stores identifications of the available peer nodes in a locally stored list of discovered nodes 214. Each productivity tool 112-1 . . . 112-N is illustrated in FIG. 1 by productivity tool 112. Each plug-in 116-1 . . . 116-N is illustrated in FIG. 1 by plug-in 116. Additional details of the process performed by installer 206 and network discovery tool 118 are discussed below relative to FIG. 3.

Subscriber manager 122 receives an alert about a newly discovered node whose availability was discovered by network discovery tool 118 and whose identification was stored in discovered nodes list 214. Hereinafter, the newly discovered node is also referred to as computer system 104 in FIG. 1. Subscriber manager 122 sends a query via a user interface to a user 218 of computer system 102 (see FIG. 1) about whether computer system 104 (see FIG. 1) (i.e., the newly discovered peer node) is permitted to subscribe to computer system 102 (see FIG. 1). After receiving an affirmation from user 218 about permitting computer system 104 (see FIG. 1) to subscribe, subscriber manager 122 sends a subscription request via network 110, which may use a digital certificate (e.g., a certificate conforming to the X.509 standard).

A software-based subscriber manager 220 running on computer system 104 (see FIG. 1) (i.e., the newly discovered peer node) receives the subscription request and may request a user of computer system 104 (see FIG. 1) for an approval of the subscription request. In the example shown in FIG. 2, user 222 sends an approval of the subscription request to subscriber manager 220. Subscription manager 220 registers computer system 102 (see FIG. 1) in a list of authorized nodes 224, which is stored in a computer data storage device that is local to computer system 104 (see FIG. 1). Further, computer system 104 (see FIG. 1) sends a confirmation of computer system 102 being on the list of authorized nodes 224 via network 110 to subscriber manager 122. Additional details about the functionality of subscriber manager 122 and subscriber manager 220 are discussed below relative to FIG. 6.

A productivity tool 112-N creates or edits an asset and subsequently receives a selection from user 218 to save the asset. In response to receiving the selection to save the asset, plug-in 116-N in productivity tool 112-N presents an option via a user interface to user 218 to share the asset with other peer nodes in system 100 (see FIG. 1). After receiving the user selection to share the asset and determining that the indication to share the asset is new, plug-in 116-N requests and receives meta data (i.e., asset meta data) that specifies the properties and content of the asset. Asset publisher manager 120 receives the meta data and utilizes a notification infrastructure 228 to post and send a message that includes the asset meta data to the subscribed peer nodes, which includes computer system 104 (see FIG. 1). Additional details about a plug-in of a productivity tool initiating the sharing of an asset and about the functionality of the asset publisher manager are discussed below relative to FIG. 4 and FIG. 5.

A software based publishing receiver 230 running on computer system 104 (see FIG. 1) receives the asset meta data from computer system 102 (see FIG. 1) via network 110. Publishing receiver 230 notifies user 222 about the asset to be shared and sends a query asking whether the user wants to retrieve the asset. The user 222 may or may not send an affirmation to publishing receiver 230 that indicates that the asset should be retrieved immediately. Regardless of whether the user indicates that the asset should be retrieved immediately, publishing receiver 230 updates a local catalog 232 of available assets on the network. The update of the local catalog 232 stores a couple that includes an identification of computer system 102 (see FIG. 1) (i.e., the source of the asset that is being retrieved) and the asset meta data. Additional details about the functionality of publishing receiver 230 are discussed below relative to FIG. 7.

After receiving the indication from user 222 that the asset should be retrieved immediately, publishing receiver 230 instructs a software-based shared asset manager 234 running on computer system 104 (see FIG. 1) to download the asset. Shared asset manager 234 uses a digital certificate (e.g., a certificate conforming to the X.509 standard) to send a request via network 110 to download the asset, where the request includes the asset meta data. Shared asset manager 126 running on computer system 102 (see FIG. 1) (i.e., the source of the asset being retrieved) receives the download request and verifies the credentials associated with the request. The shared asset manager 126 may also notify user 218 (i.e., the owner of the asset) about the download request and subsequently receive permission from the owner of the asset to download and transfer the asset to computer system 104 (see FIG. 1). Shared asset manager 126 downloads the asset from local disk 202 and sends the asset via network 110 to shared asset manager 234. Shared asset manager 234 receives and stores the asset in a computer data storage repository that is local to computer system 104 (see FIG. 1) (i.e., local disk 236). Additional details about the functionality of shared asset manager 126 and shared asset manager 234 are discussed below relative to FIG. 8A and FIG. 8B, respectively.

If user 222 does not respond to publishing receiver 230 that the asset should be retrieved immediately, then user 222 has the opportunity to use a software-based asset searcher 238 running on computer system 104 (see FIG. 1) to later search for the asset. Asset searcher 238 receives content associated with the asset and loads the local catalog 232. For each node identified in the local catalog 232, asset searcher 238 searches for a match between the received content and the meta data stored in the local catalog. If a match to the content is found in the meta data stored in the local catalog 232, then asset searcher 238 instructs shared asset manager 234 to retrieve the asset from the peer node that the search of the local catalog 232 identifies as being associated with the meta data that matches the content (see FIG. 8A and FIG. 8B).

If the asset searcher 238 finds no match to the received content in the local catalog 232, then asset searcher 238 loads a list 240 of nodes discovered in the network. For each unsubscribed node in the loaded list 240, asset searcher 238 sends a request for a subscription (see FIG. 6). For one or more new subscriptions obtained by the asset searcher's requests, the asset searcher 238 (1) retrieves list(s) of source node identification—asset meta data couples that are locally stored at each of the new subscribed nodes; (2) updates the local catalog 232 with the newly retrieved source node identification—asset meta data couples; and (3) searches the updated local catalog 232 for meta data that matches the received content. Asset searcher 238 instructs shared asset manager 234 to retrieve the asset from the peer node that the search of the local catalog 232 identifies as being associated with meta data that matches the content. Additional details about the functionality of asset searcher 238 are discussed below relative to FIG. 9.

Figure 3:
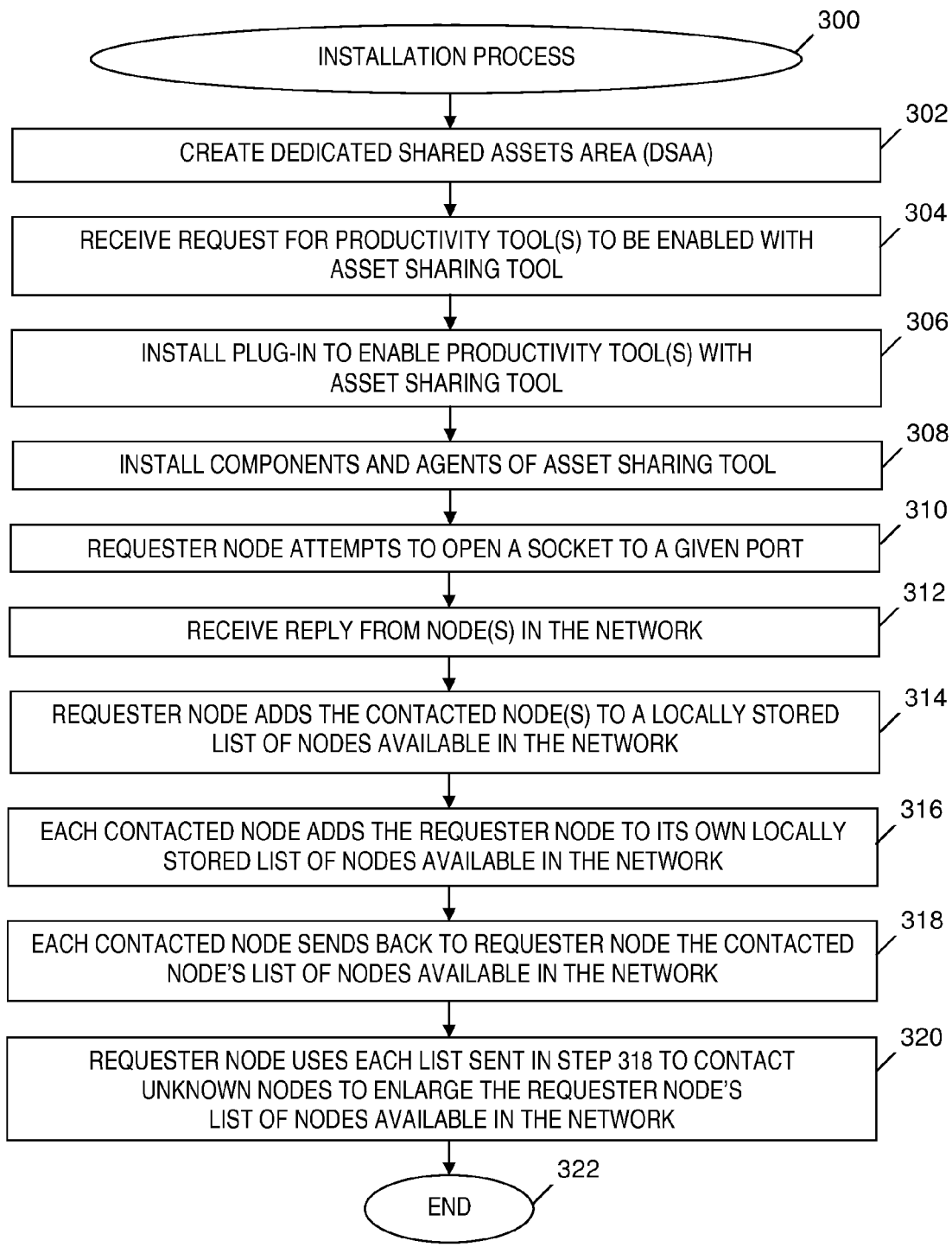
FIG. 3 is a flowchart of a sub-process of installing the asset sharing tool, where the sub-process is included the process of FIG. 2, in accordance with embodiments of the present invention.

FIG. 3 is a flowchart of a sub-process of installing the asset sharing tool, where the sub-process is included the process of FIG. 2, in accordance with embodiments of the present invention. The sub-process of installing the asset sharing tool 114 (see FIG. 1) starts at step 300. In step 302, computer system 102 (see FIG. 1) creates a dedicated shared assets area (DSAA) in a computer storage device coupled to computer system 102 (see FIG. 1). The DSAA stores meta data that specifies characteristics of assets to be shared in the peer-to-peer network.

In step 304, computer system 102 (see FIG. 1) receives a request for one or more productivity tools to be enabled with asset sharing tool 114 (see FIG. 1).

In step 306, computer system 102 (see FIG. 1) installs plug-in 116 (see FIG. 1) to enable the aforementioned productivity tool(s) with asset sharing tool 114 (see FIG. 1).

In step 308, computer system 102 (see FIG. 1) installs the components and agents of asset sharing tool 114 (see FIG. 1). The plug-in 116 (see FIG. 1) provides a novel integration of the functionality of the asset sharing tool 114 (see FIG. 1) with the enabled productivity tool(s).

In step 310, computer system 102 (see FIG. 1) acting as a requester node attempts to contact other peer nodes in the peer-to-peer network included in system 100 (see FIG. 1) by attempting to open a socket to a given port defined by the asset sharing tool 114 (see FIG. 1).

In step 312, computer system 102 (see FIG. 1) receives a reply from one or more peer nodes that are contacted as a result of the attempt in step 310. The reply includes identification(s) (e.g., names) of the contacted peer node(s).

In step 314, computer system 102 (see FIG. 1) adds the identification(s) of the contacted peer node(s) to a locally stored list 134 (see FIG. 1) of nodes that are available in the peer-to-peer network included in system 100 (see FIG. 1).

In step 316, each contacted peer node adds an identification (e.g., name) of the requester node (i.e., computer system 102 in FIG. 1) to its own locally stored list of nodes that are available in the peer-to-peer network. That is, each contacted peer node updates a locally stored list of nodes that is analogous to list 124 (see FIG. 1).

In step 318, each contacted peer node sends back to the requester node the contacted node's list of nodes available in the peer-to-peer network.

In step 320, the requester node (i.e., computer system 102 in FIG. 1) uses each list sent in step 318 to contact unknown peer nodes to enlarge the requester node's list 134 (see FIG. 1) of nodes that are available in the peer-to-peer network.

The installation process of FIG. 3 ends at step 322.

Figure 4:
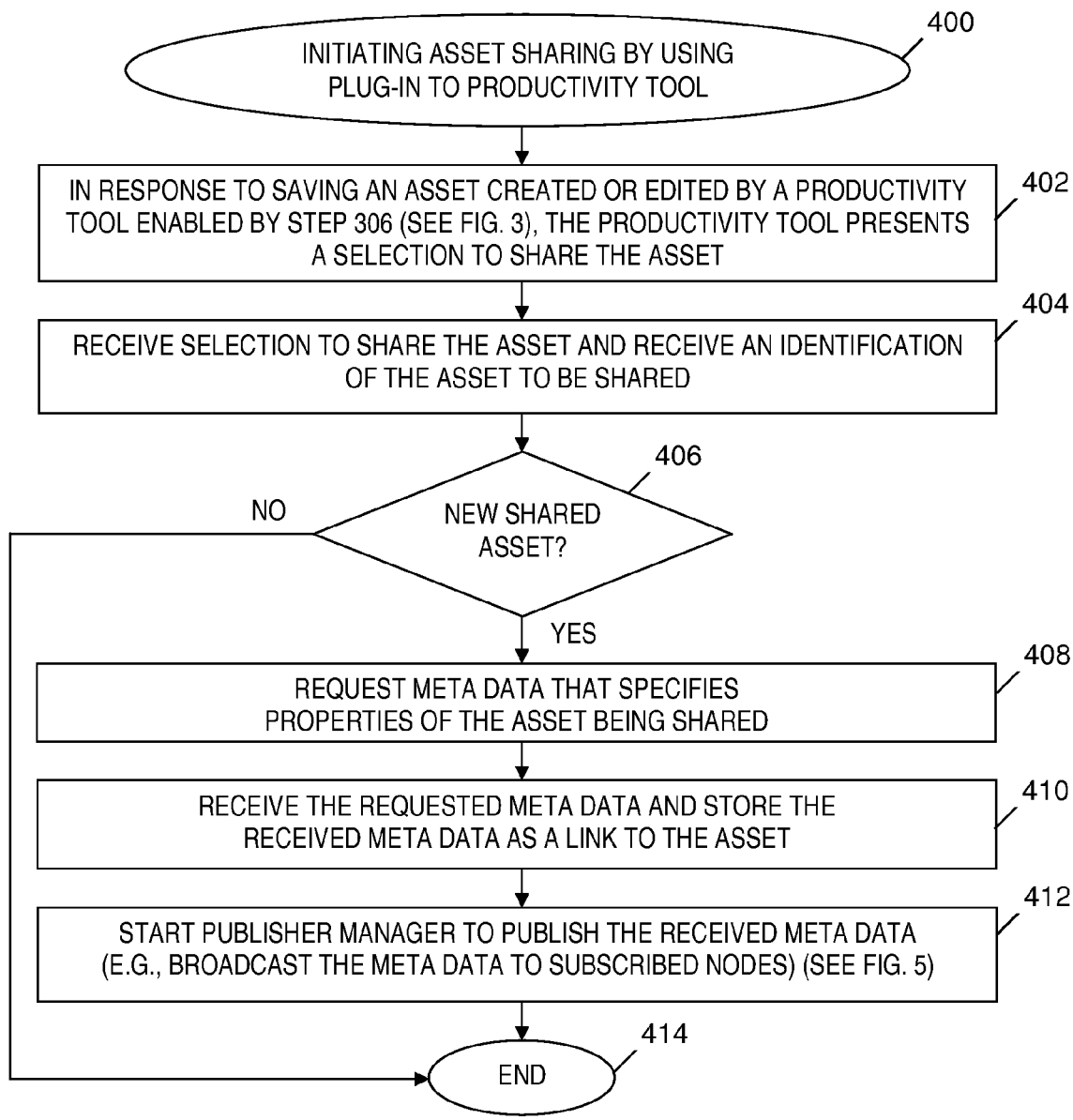
FIG. 4 is a sub-process of activating a plug-in that initiates the asset sharing tool, where the sub-process is included the process of FIG. 2, in accordance with embodiments of the present invention.

FIG. 4 is a sub-process of activating a plug-in that initiates the asset sharing tool, where the sub-process is included the process of FIG. 2, in accordance with embodiments of the present invention. The sub-process of activating plug-in 116 (see FIG. 1) that initiates asset sharing tool 114 (see FIG. 1) starts at step 400. In step 402, in response to saving an asset created or edited by a productivity tool (e.g., productivity tool 112 in FIG. 1) enabled by step 306 (see FIG. 3), the productivity tool presents a selection to a user to share the asset. For example, when a user selects "Save" or "Save As" in a productivity tool, a window pops up that asks the user "Do you want to share this?".

In step 404, plug-in 116 (see FIG. 1) receives the user's selection to share the asset and receives an identification of the asset to be shared.

In step 406, plug-in 116 (see FIG. 1) determines whether the asset to be shared is a new shared asset (i.e., an asset that has not been shared before step 406). If the asset is a new shared asset, the Yes branch of step 406 is taken and step 408 is performed.

In step 408, plug-in 116 (see FIG. 1) requests that the user provide meta data that specifies properties of the asset to be shared. The properties requested by the plug-in are structured by the ontology 130 (see FIG. 1). The properties requested may include, but are not limited to, the name of the asset, a description of the asset, what the asset is useful for, and a specification of the confidentiality of the asset. The meta data requested is used to classify the asset inside a managed assets domain. The classification of the asset by the meta data facilitates a subsequent search for the asset. The managed assets domain is modeled using ontology 130 (see FIG. 1).

In step 410, plug-in 116 (see FIG. 1) receives the requested meta data and stores the received meta data in the DSAA as a link to the asset.

In step 412, asset sharing tool 114 (see FIG. 1) starts asset publisher manager 120 (see FIG. 1) to publish the received meta data. For example, asset publisher manager 120 (see FIG. 1) broadcasts the received meta data to subscribed peer nodes in system 100 (see FIG. 1). The details of publishing the received meta data are found below in the discussion of FIG. 5.

After step 412, the process of FIG. 4 ends at step 414. Returning to step 406, if the plug-in 116 (see FIG. 1) determines that the asset to be shared is not a new shared asset, then the No branch of step 406 is taken and the process of FIG. 4 ends at step 414.

Figure 5:
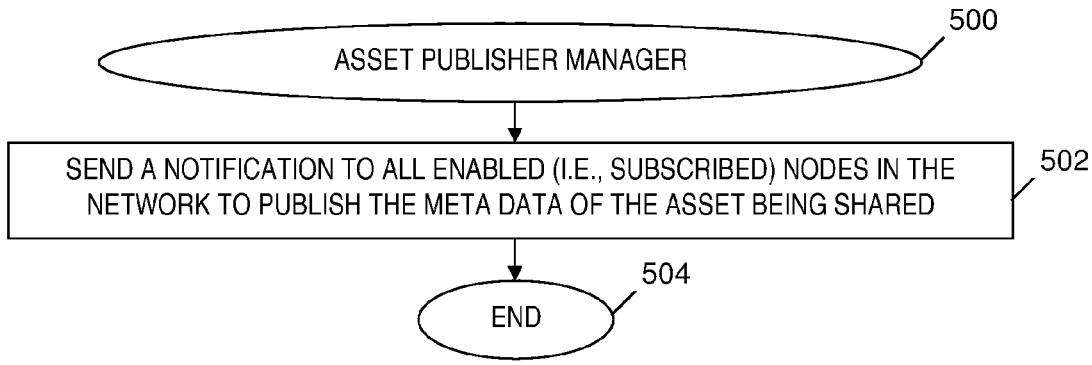
FIG. 5 is a sub-process of publishing asset meta data, where the sub-process is included the process of FIG. 2, in accordance with embodiments of the present invention.

FIG. 5 is a sub-process of publishing asset meta data, where the sub-process is included the process of FIG. 2, in accordance with embodiments of the present invention. The sub-process of publishing asset meta data begins at step 500. In step 502, asset publisher manager 120 (see FIG. 1) sends a novel notification to all enabled (i.e., subscribed) peer nodes in the peer-to-peer network included in system 100 (see FIG. 1) to publish the meta data that specifies the properties of the asset being shared. The enabled peer nodes that receive the notification (i.e., the notified peer nodes) are sharing partners in the peer-to-peer network included in system 100 (see FIG. 1). It should be noted that the asset publisher manager sends the notification in an automatic, unattended and transparent manner, and publishes the meta data that specifies the asset without sending the asset itself. In one embodiment, step 502 may be performed each time a new asset is created in a productivity tool. In step 504, the sub-process of FIG. 5 ends.

Figure 6:
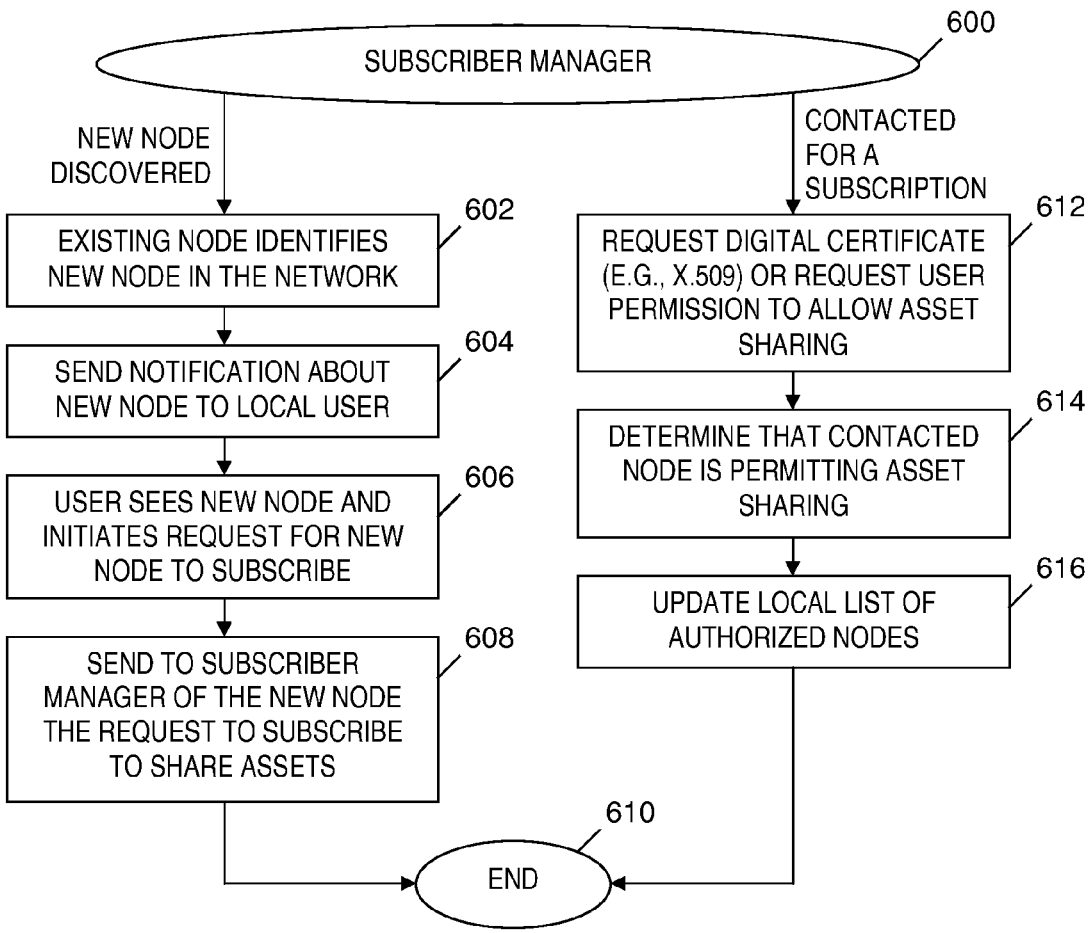
FIG. 6 is a sub-process of managing a subscription of a peer node, where the sub-process is included the process of FIG. 2, in accordance with embodiments of the present invention.

FIG. 6 is a sub-process of managing a subscription of a peer node, where the sub-process is included the process of FIG. 2, in accordance with embodiments of the present invention. The sub-process of managing a subscription of a peer node begins at step 600. After step 600, the sub-process of FIG. 6 continues if (1) a new peer node is discovered; or (2) if a peer node is contacted for a subscription.

In step 602, computer system 102 (see FIG. 1) discovers a new peer node in the peer-to-peer network included in system 100 (see FIG. 1). In step 604, subscriber manager 122 (see FIG. 1) sends a notification about the new peer node to a user of computer system 102 (see FIG. 1). In step 606, the user utilizes a GUI and sees the notification about the new peer node, and in response, initiates a request for the new peer node to subscribe (i.e., to become one of the sharing partners that shares assets with computer system 102 in FIG. 1).

In step 608, computer system 102 (see FIG. 1) sends to the subscriber manager of the new peer node the request to subscribe to share the new peer node's assets (i.e., the assets that are stored in a computer storage device that is local to the new peer node). After step 608, the sub-process of FIG. 6 ends at step 610.

If a peer node (e.g., computer system 104 in FIG. 1) is contacted for a subscription, then step 612 follows step 600. In step 612, the subscriber manager of the contacted peer node requests a digital certificate (e.g., a certificate conforming to the X.509 standard) or requests permission from a user of the contacted peer node (i.e., permission to allow asset sharing).

In step 614, the subscriber manager module (i.e., a module analogous to subscriber manager 120 in FIG. 1) of the contacted peer node determines that the contacted peer node is permitting asset sharing. In step 616, the subscriber manager module of the contacted peer node updates a locally stored list of authorized peer nodes (i.e., a list of authorized sharing partners stored in a computer data storage device that is local to the contacted peer node). After step 616, the sub-process of FIG. 6 ends at step 610.

Figure 7:
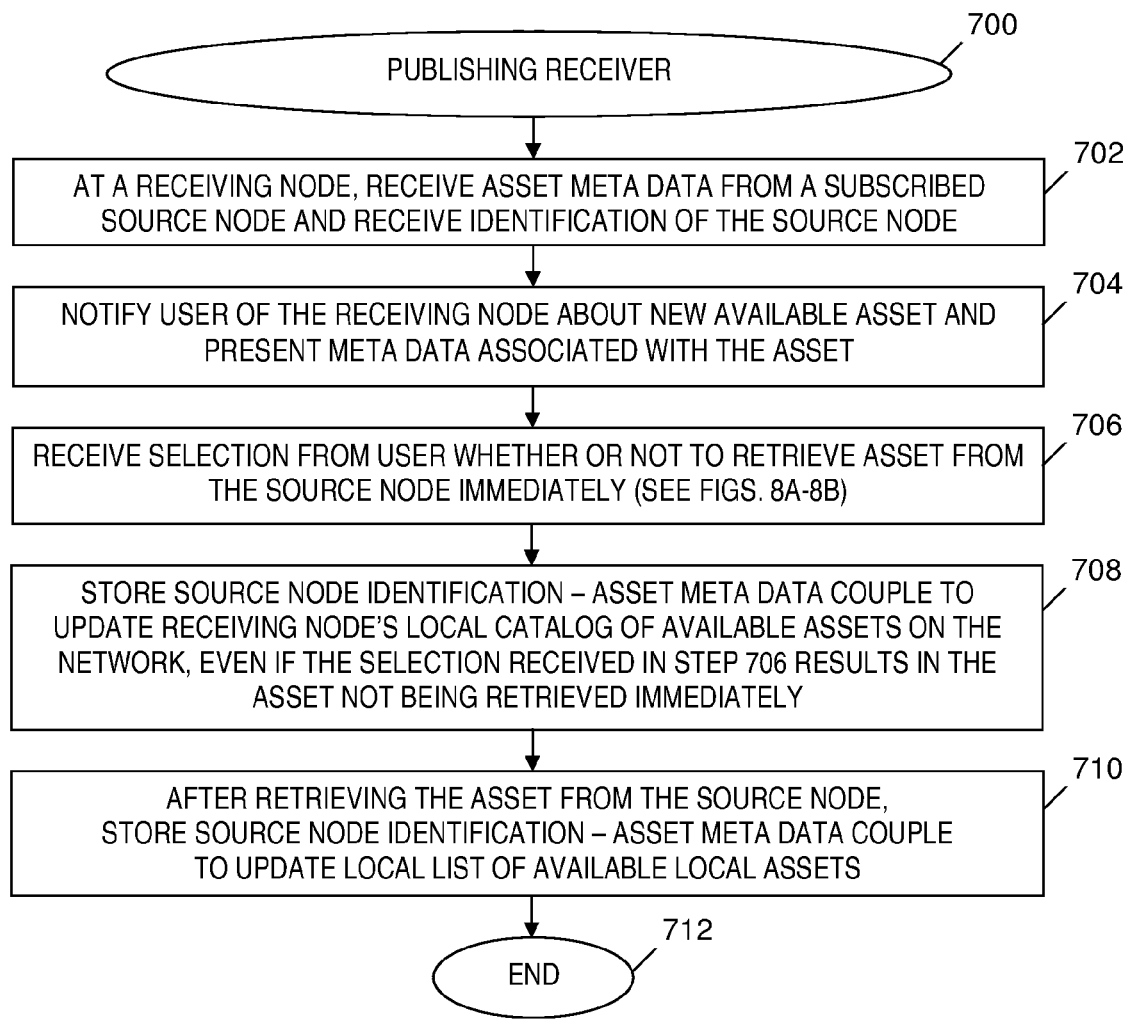
FIG. 7 is a sub-process of receiving an asset publication from a subscribed source, where the sub-process is included the process of FIG. 2, in accordance with embodiments of the present invention.

FIG. 7 is a sub-process of receiving an asset publication from a subscribed source, where the sub-process is included the process of FIG. 2, in accordance with embodiments of the present invention. The sub-process of receiving an asset publication from a subscribed source node starts at step 700. In step 702, the publishing receiver module of a receiving node (i.e., a peer node that receives a notification from the asset publisher manager in the sub-process of FIG. 5) (e.g., computer system 104 in FIG. 1) receives asset meta data published from a subscribed source node (e.g., computer system 102 in FIG. 1) and receives an identification of the source node.

In step 704, the publishing receiver module of the receiving node notifies a user of the receiving node about the asset that is newly available for sharing among the peer nodes in system 100 (see FIG. 1). Furthermore, in step 704, the publishing receiver module also presents to the user the meta data that specifies the properties of the newly available asset.

In step 706, the publishing receiver module of the receiving node receives a selection from the user that indicates whether or not to retrieve the asset from the source node immediately. If the user selection indicates that the asset is not to be retrieved from the asset immediately, then the user of the receiving node has an opportunity to retrieve the asset at a later time by searching for the asset using the process described below relative to FIG. 9. The immediate or later retrieval of the asset is described in more detail below relative to FIGS. 8A and 8B.

In step 708, the publishing receiver module of the receiving node stores a couple that includes an identification of the source node and the asset meta data. By storing the couple, the publishing receiver module updates the local catalog of source node identifications—asset meta data couples that identify available assets in the peer-to-peer network included in system 100 (see FIG. 1) (i.e., updates a catalog analogous to catalog 136 in FIG. 1), where the catalog is local to the receiving node. It should be noted that the publishing receiver module captures the meta data from the notification sent by the asset publisher manager, as described above relative to FIG. 5, and updates the catalog of source node identifications and corresponding meta data, even if the selection received in step 706 results in the asset not being retrieved immediately. At each notified peer node, a local catalog of source node identifications and corresponding meta data is updated as described above, thereby providing a virtual assets depot at each notified peer node, while at the same time providing a distributed asset catalog across the network of peer nodes. Because the local catalog of source node identifications—asset meta data couples is updated even without immediately receiving the asset itself, the receiving node may retrieve the asset later by using an efficient local search of the catalog. The local search of the catalog is described below relative to FIG. 9.

In step 710, after retrieving the asset from the source node (which may occur after a search described below relative to FIG. 9), the publishing receiver module (i.e., a module analogous to publishing receiver 124 in FIG. 1) of the receiving node stores the couple that includes the source node identification and the asset meta data to update a locally stored list of locally stored assets that are available to be shared with other peer nodes. After step 710, the sub-process of FIG. 7 ends at step 712.

Figure 8A:
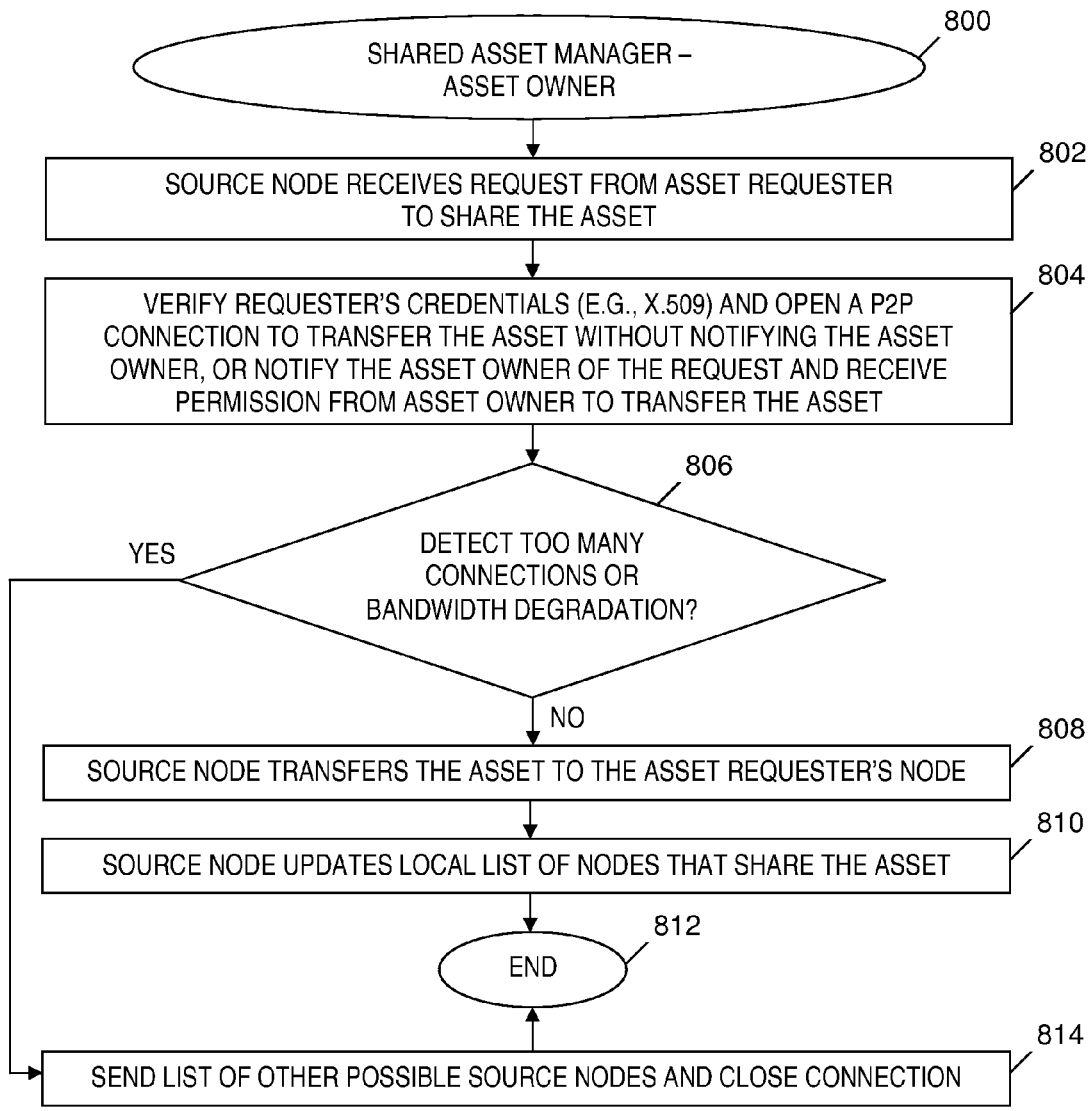
FIG. 8A is a sub-process of an asset owner managing a shared asset, where the sub-process is included the process of FIG. 2, in accordance with embodiments of the present invention.

FIG. 8A is a sub-process of an asset owner managing a shared asset, where the sub-process is included the process of FIG. 2, in accordance with embodiments of the present invention. The sub-process of an asset owner managing a shared asset begins at step 800. In step 802, the shared asset manager 126 (see FIG. 1) of computer system 102 (see FIG. 1) (i.e., the source node at which the asset is locally stored) receives a request to share the asset. The request to share the asset is received from another peer node (e.g., computer system 104 in FIG. 1) that is used by an asset requester.

In step 804, the shared asset manager 126 (see FIG. 1) of the source node verifies the requester's credentials (e.g., by using a certificate format specified by X.509) and either (1) opens a P2P connection to transfer the asset without notifying the owner of the asset, or (2) notifies the asset owner of the request to share the asset and subsequently receives permission from the asset owner to transfer the asset.

In step 806, shared asset manager 126 (see FIG. 1) determines whether the number of opened P2P connections exceeds a predefined threshold amount and/or whether bandwidth degradation in the peer-to-peer network included in system 100 (see FIG. 1) is detected according to predefined criteria. If step 806 determines that the number of opened P2P connections does not exceed the threshold amount and that bandwidth degradation is not detected, then the No branch of step 806 is taken and step 808 is performed.

In step 808, the source node transfers the asset to the peer node (e.g., computer system 104 in FIG. 1) being used by the asset requester (i.e., the peer node from which the request was received in step 802).

In step 810, the source node updates the local list of nodes that share the asset (i.e., updates catalog 136 (see FIG. 1) of the source node identification—asset meta data couples for assets that are available for sharing in the peer-to-peer network. Following step 810, the sub-process of FIG. 8A ends at step 812.

Returning to step 806, if the shared asset manager 126 (see FIG. 1) detects a number of P2P connections that exceeds the predefined threshold amount and/or detects bandwidth degradation according to the predefined criteria, then the Yes branch of step 806 is taken and step 814 is performed.

In step 814, the source node sends to the peer node being used by the asset requester a list of one or more other possible source nodes that may share the asset and closes the opened P2P connection. Following step 814, the sub-process of FIG. 8A ends at step 812.

Figure 8B:
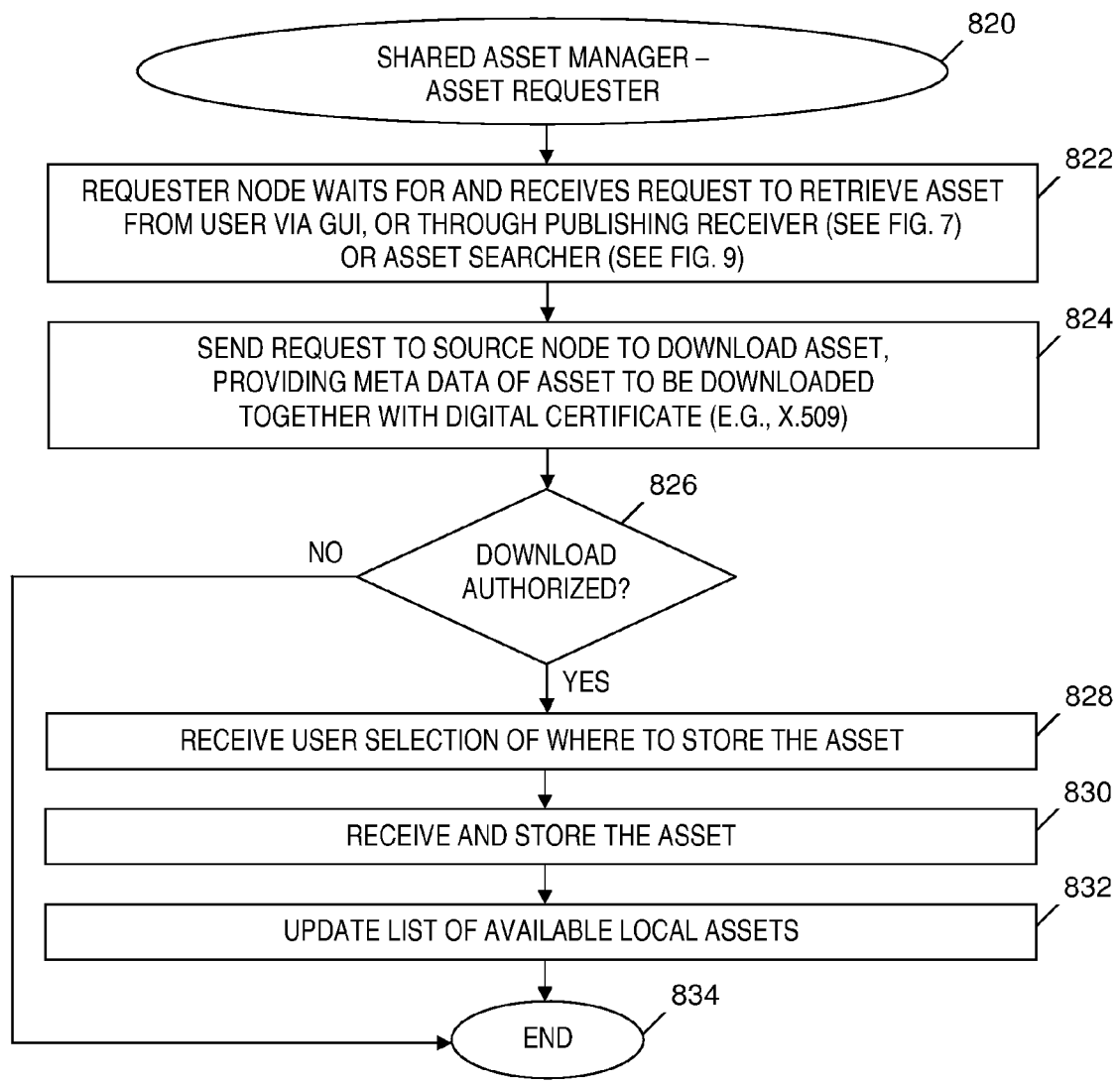
FIG. 8B is a sub-process of an asset requester managing a shared asset, where the sub-process is included the process of FIG. 2, in accordance with embodiments of the present invention.

FIG. 8B is a sub-process of an asset requester managing a shared asset, where the sub-process is included the process of FIG. 2, in accordance with embodiments of the present invention. The sub-process of an asset requester managing a shared asset begins at step 820. In step 822, the shared asset manager of computer system 104 (see FIG. 1) (i.e., the requester node) waits for and receives a request to retrieve an asset. The request to retrieve the asset is received from a user (i.e., asset requester) via a GUI, through a publishing receiver module (see the discussion relative to FIG. 7), or through an asset searcher module (see the discussion relative to FIG. 9).

In step 824, the shared asset manager module of the requester node sends a request to the source node (i.e., computer system 102 in FIG. 1) to download the asset, meta data that specifies properties of the asset to be downloaded, and a digital certificate (e.g., a certificate format specified by X.509).

In step 826, the shared asset manager module of the requester node determines whether the download of the asset is authorized by the source node. If the download of the asset is determined to be authorized in step 826, then the Yes branch of step 826 is taken and step 828 is performed.

In step 828, the requester node receives a user selection that specifies the DSAA or another local file system location in which the asset will be stored after the asset is received by the requester node.

In step 830, the requester node receives the asset from the source node, and stores the asset in the DSAA or other file system location specified by the selection received in step 828.

In step 832, the requester node adds an identification of the asset received in step 830 to update a list of assets that are stored in a computer storage device that is local to the requester node. The updated list of assets includes the assets that are available for sharing in the peer-to-peer network. Following step 832, the sub-process of FIG. 8B ends at step 834.

Returning to step 826, if the shared asset manager module of the requester node determines that the download of the asset is not authorized by the source node, then the No branch of step 826 is taken and the sub-process of FIG. 8B ends at step 834.

Figure 9:
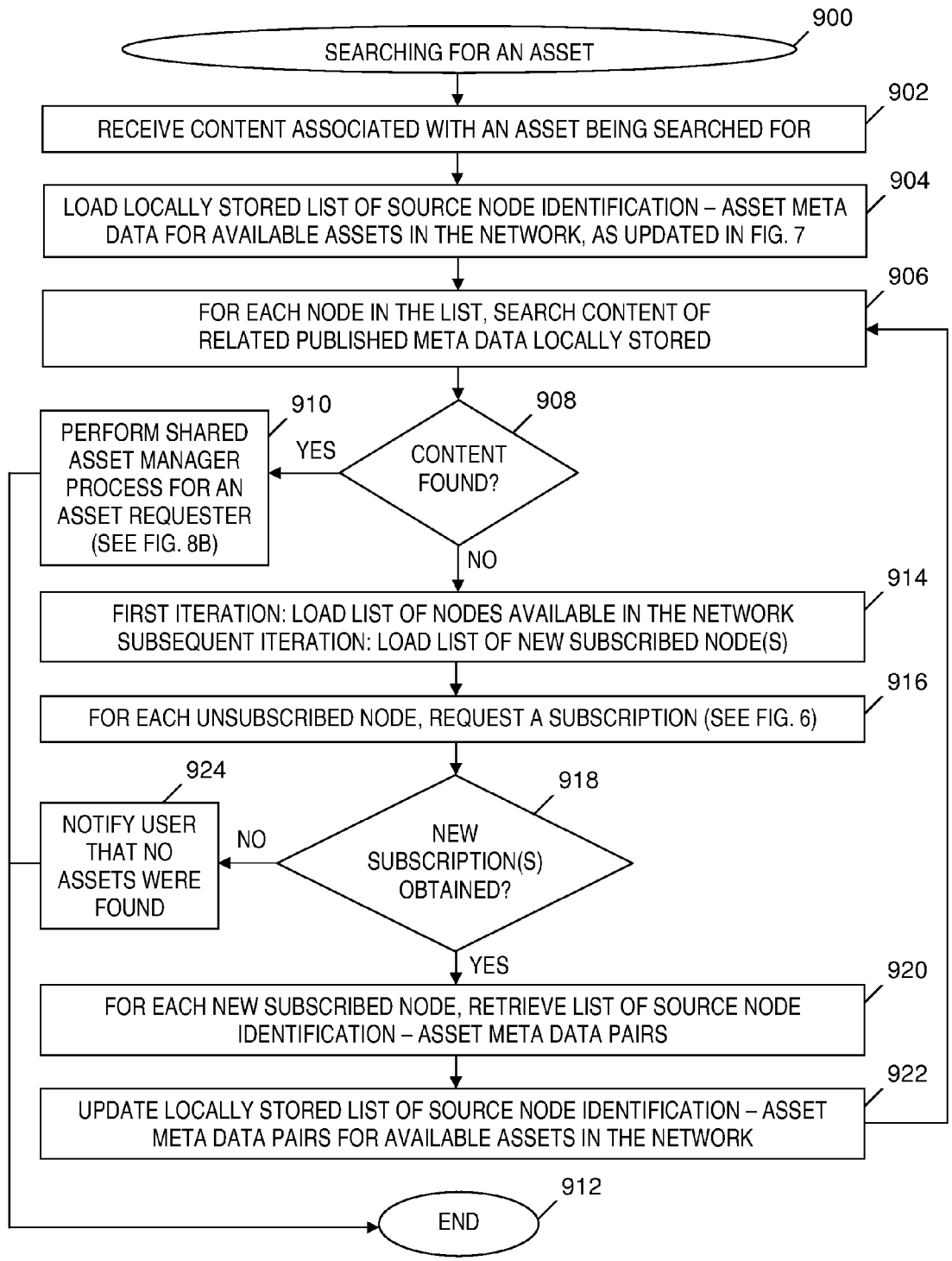
FIG. 9 is a sub-process of searching for an asset, where the sub-process is included the process of FIG. 2, in accordance with embodiments of the present invention.

FIG. 9 is a sub-process of searching for an asset, where the sub-process is included the process of FIG. 2, in accordance with embodiments of the present invention. The sub-process of searching for an asset starts at step 900, and may be used when a user is looking for an asset. The user who is initiating the search may have not been notified about a particular asset, or may not know that the asset exists. The user may have recently joined the peer-to-peer network or may not have been subscribed to some source nodes.

The sub-process of searching for an asset disclosed herein does not utilize a distributed hash table to perform a distributed search on multiple nodes. Instead, the novel search performed by the asset searcher disclosed herein is efficiently limited to a search of a locally stored catalog of source node identifications and corresponding asset meta data (i.e., a catalog analogous to catalog 136 in FIG. 1).

In step 902, a requester node (e.g., computer system 104 in FIG. 1) receives content that describes an asset to be searched for.

In step 904, an asset searcher module (i.e., a module analogous to asset searcher 128 in FIG. 1) in the requester node loads the locally stored catalog of source node identification—asset meta data couples (i.e., a catalog analogous to catalog 136 in FIG. 1 that is local to the requester node), where the asset meta data specifies properties of assets that are available for sharing in the peer-to-peer network included in system 100 (see FIG. 1). The locally stored catalog is updated and managed by the publishing receiver module, as described above relative to FIG. 7.

In step 906, for each source node in the catalog loaded in step 904, the asset searcher module running at the requester node searches for the content received in step 902 within the published meta data that is also locally stored in the catalog loaded in step 904. In one embodiment, the asset searcher module utilizes a reasoning tool to identify a best match between the content received in step 902 and the meta data that is locally stored in the catalog loaded in step 904. The aforementioned best match may be based on the classifications provided by ontology 130 (see FIG. 1).

In step 908, if the asset searcher module determines that the content being searched for in step 906 is found in a meta data entry in the catalog loaded in step 904, then the Yes branch of step 908 is taken and step 910 is performed.

In step 910, the shared asset manager module of the requester node performs the sub-process of FIG. 8B to request, receive and store the asset specified by the meta data in which the content is found in step 908. Following step 910, the sub-process of FIG. 9 ends at step 912.

Returning to step 908, if the asset searcher module determines that the content being searched for in step 906 is not found, then the No branch of step 908 is taken and step 914 is performed.

In step 914 performed in a first iteration of a loop that starts at step 906, the requester node loads a list of peer nodes available in the peer-to-peer network (i.e., a list analogous to list 134 in FIG. 1). In step 916, for each unsubscribed node in the list of peer nodes loaded in step 914, the subscriber manager module of the requester node sends the unsubscribed node a request for a subscription, and the sub-process of FIG. 6 is performed.

In step 918, the requester node determines whether any new subscriptions were obtained as a result of step 916. If step 918 determines that at least one new subscription is obtained by step 916, then the Yes branch of step 918 is taken and step 920 is performed.

In step 920, the requester node receives a catalog of source node identifications—asset meta data couples from each newly subscribed peer node.

In step 922, based on the catalog(s) received in step 920, the requester node updates its locally stored catalog of source node identifications—asset meta data couples that identify assets that are available for sharing in the peer-to-peer network.

Following step 922, the sub-process of FIG. 9 loops back to step 906 to search for the content within the meta data in the updated, locally stored catalog. In the subsequent iteration of the loop that starts at step 906, the requester node loads in step 914 a list of new subscribed node(s), as identified by the Yes branch of step 918, rather than the full list of nodes available in the network (i.e., rather than the list that was loaded in step 914 that was performed in the first iteration of the aforementioned loop).

Returning to step 918, if the requester node determines that no new subscriptions were obtained by step 916, then the No branch of step 918 is followed and step 924 is performed. In step 924, the requester node notifies a user of the requester node that no assets were found as a result of the search initiated in step 900. Following step 924, the sub-process of FIG. 9 ends at step 912.

Computer System

Figure 10:
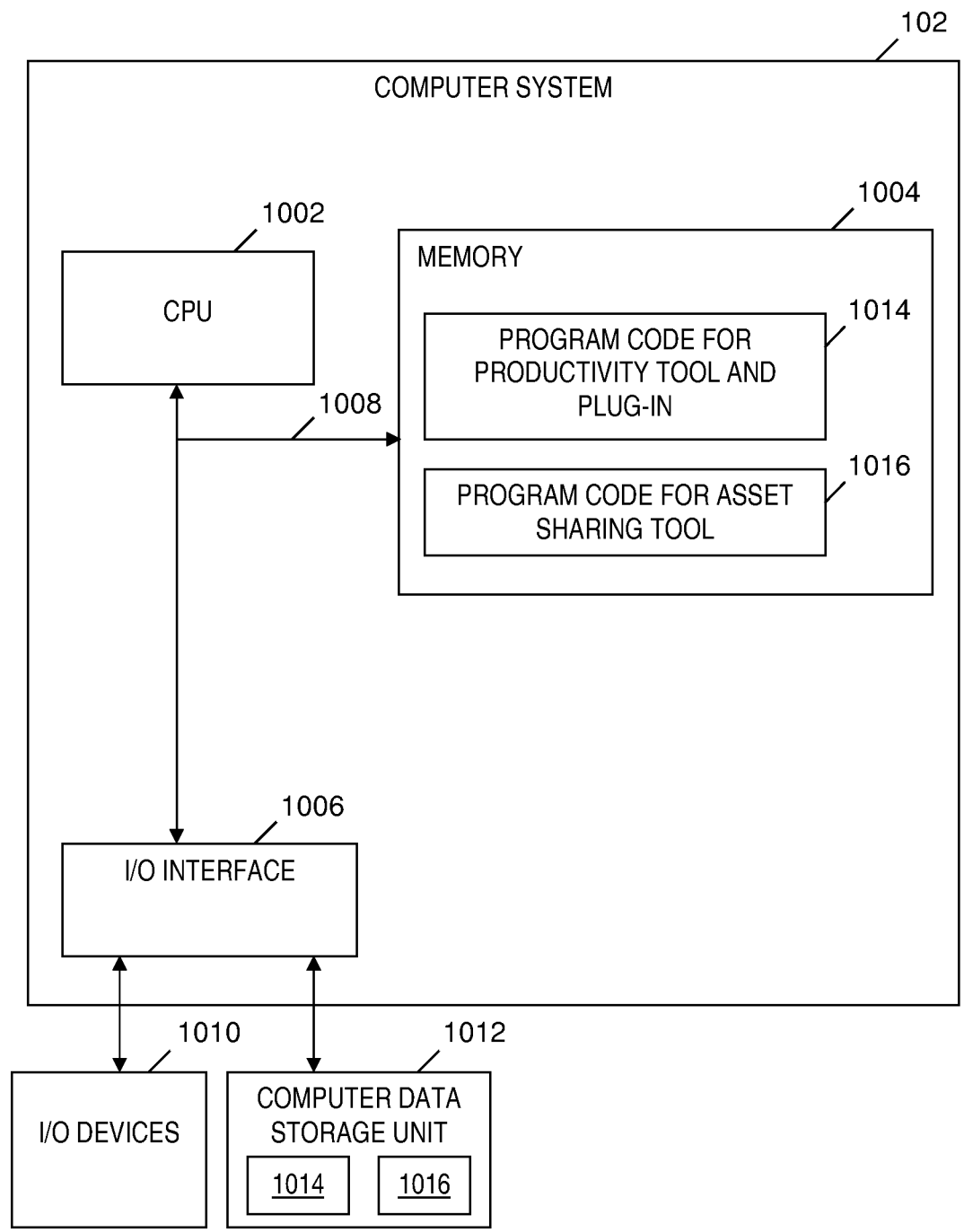
FIG. 10 is a block diagram of a computer system that is included in the system of FIG. 1 and that implements the process of FIG. 2, in accordance with embodiments of the present invention.

FIG. 10 is a block diagram of a computer system that is included in the system of FIG. 1 and that implements the process of FIG. 2, in accordance with embodiments of the present invention. Computer system 102 generally comprises a central processing unit (CPU) 1002, a memory 1004, an input/output (I/O) interface 1006, and a bus 1008. Further, computer system 102 is coupled to I/O devices 1010 and a computer data storage unit 1012. CPU 1002 performs computation and control functions of computer system 102, including carrying out instructions included in program code 1014 and 1016 to perform asset sharing, where the instructions are carried out by CPU 1002 via memory 1004. CPU 1002 may comprise a single processing unit, or be distributed across one or more processing units in one or more locations (e.g., on a client and server). Although FIG. 10 depicts computer system 102, it is understood that any of the peer nodes contemplated as being included in system 100 (see FIG. 1) (e.g., computer system 104 in FIG. 1) may include and be coupled to components that are analogous to the components depicted in FIG. 10.

Memory 1004 may comprise any known computer-readable storage medium, which is described below. In one embodiment, cache memory elements of memory 1004 provide temporary storage of at least some program code (e.g., program code 1014 and 1016) in order to reduce the number of times code must be retrieved from bulk storage while instructions of the program code are carried out. Moreover, similar to CPU 1002, memory 1004 may reside at a single physical location, comprising one or more types of data storage, or be distributed across a plurality of physical systems in various forms. Further, memory 1004 can include data distributed across, for example, a local area network (LAN) or a wide area network (WAN).

I/O interface 1006 comprises any system for exchanging information to or from an external source. I/O devices 1010 comprise any known type of external device, including a display device (e.g., monitor), keyboard, mouse, printer, speakers, handheld device, facsimile, etc. Bus 1008 provides a communication link between each of the components in computer system 102, and may comprise any type of transmission link, including electrical, optical, wireless, etc.

I/O interface 1006 also allows computer system 102 to store information (e.g., data or program instructions such as program code 1014 and 1016) on and retrieve the information from computer data storage unit 1012 or another computer data storage unit (not shown). Computer data storage unit 1012 may comprise any known computer-readable storage medium, which is described below. For example, computer data storage unit 1012 may be a non-volatile data storage device, such as a magnetic disk drive (i.e., hard disk drive) or an optical disc drive (e.g., a CD-ROM drive which receives a CD-ROM disk).

Memory 1004 and/or storage unit 1012 may store computer program code 1014 and 1016 that includes instructions that are carried out by CPU 1002 via memory 1004 to perform asset sharing. Although FIG. 10 depicts memory 1004 as including program code 1014 and 1016, the present invention contemplates embodiments in which memory 1004 does not include all of code 1014 and 1016 simultaneously, but instead at one time includes only code 1014, only code 1016, only a portion of code 1014 and/or 1016, or a combination of code 1014 and 1016.

Further, memory 1004 may include other systems not shown in FIG. 10, such as an operating system (e.g., Linux) that runs on CPU 1002 and provides control of various components within and/or connected to computer system 102.

Storage unit 1012 and/or one or more other computer data storage units (not shown) that are coupled to computer system 102 may store ontology 130 (see FIG. 1), shared assets 132 (see FIG. 1), list of nodes discovered in the peer-to-peer network 134 (see FIG. 1), and the catalog of source node identifications—asset meta data couples 136 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 1004 and/or computer data storage unit 1012) having computer-readable program code (e.g., program code 1014 and 1016) embodied or stored thereon.

Any combination of one or more computer-readable mediums (e.g., memory 1004 and computer data storage unit 1012) may be utilized. The computer readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 1014 and program 1016) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 1014 and 1016) embodied on a computer-readable medium may be transmitted using any appropriate medium, including but not limited to wireless, wireline, optical fiber cable, RF, etc., or any suitable combination of the foregoing.

Computer program code (e.g., program code 1014 and 1016) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 10. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2-7, FIG. 8A, FIG. 8B and FIG. 9) and/or block diagrams of methods, apparatus (systems) (e.g., FIG. 1 and FIG. 10), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 1014 or 1016). These computer program instructions may be provided to one or more hardware processors (e.g., CPU 1002) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 1004 or computer data storage unit 1012) that can direct a computer (e.g., computer system 102), other programmable data processing apparatus, or other devices to function in a particular manner, such that the instructions (e.g., program 1014 and 1016) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 1014 and 1016) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to performing asset sharing. Thus, an embodiment of the present invention discloses a process for supporting computer infrastructure, wherein the process comprises providing at least one support service for at least one of integrating, hosting, maintaining and deploying computer-readable code (e.g., program code 1014 and 1016) in a computer system (e.g., computer system 102) comprising one or more processors (e.g., CPU 1002), wherein the processor(s) carry out instructions contained in the code causing the computer system to perform asset sharing.

In another embodiment, the invention provides a method that performs the process steps of the invention on a subscription, advertising and/or fee basis. That is, a service provider, such as a Solution Integrator, can offer to create, maintain, support, etc. a process of performing asset sharing. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2-7, FIG. 8A, FIG. 8B and FIG. 9 and the block diagrams in FIG. 1 and FIG. 10 illustrate the architecture, functionality, and operation of possible implementations of systems, methods, and computer program products according to various embodiments of the present invention. In this regard, each block in the flowchart or block diagrams may represent a module, segment, or portion of code (e.g., program code 1014 and 1016), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of sharing an asset, said method comprising:
a computer receiving meta data that specifies properties of an asset to be shared by a source node in a peer-to-peer network and receiving an identification of said source node, said properties including a name of said asset, a description of said asset, a utility of said asset, and a specification of confidentiality of said asset, wherein said computer and said source node are included in a plurality of nodes of said peer-to-peer network;
said computer structuring said properties of said asset by an ontology that includes concepts that classify assets including said asset, properties of said concepts, relations between said concepts, instances of said concepts, and a glossary;

based on said received meta data and said properties structured by said ontology, said computer determining a classification of said asset;

said computer locally storing said received identification of said source node and said received meta data as a couple in a list residing in a computer data storage device local to said computer, wherein said list includes identifications of source nodes and meta data corresponding to said source nodes;

subsequent to said locally storing said received identification of said source node and said received meta data, said computer receiving content specifying said asset and a request to search for and retrieve said asset based on said content;

said computer loading said list that includes said identifications of source nodes and meta data corresponding to said source nodes;

said computer searching through said list and in response, said computer detecting said couple that includes said locally stored identification of said source node and said locally stored meta data, wherein said detecting said couple includes determining a match between said content and said locally stored meta data, said match based on said classification of said asset;

said computer identifying said source node based on said detected couple that includes said locally stored identification of said source node;

said computer sending a request to said identified source node to retrieve said asset;

said computer receiving said asset in response to said request to said identified source node, wherein a result of said receiving said asset is a sharing of said asset by said source node;

said computer receiving second meta data that specifies properties of a second asset to be shared by a second source node in said peer-to-peer network;

said computer receiving a second identification of said second source node;

said computer locally storing said received second identification of said second source node and said received second meta data as a second couple in said list;

subsequent to said locally storing said received second identification of said second source node and said received second meta data, said computer receiving second content specifying said second asset and a second request to search for and retrieve said second asset based on said second content;

in response to said receiving said second request, said computer searching said list and in response, determining said second couple is not included in said list;

in response to said determining said second couple is not included in said list, said computer identifying a new node in said network;

said computer sending a notification about said new node to a user of said computer;

said computer sending a request to said new node for a new subscription for said new node to share assets locally stored at said new node;

subsequent to said sending said request to said new node for a new subscription for said new node to share assets locally stored at said new node, said computer receiving said new subscription from said new node;

in response to said receiving said new subscription, said computer receiving from said new node a second list including one or more other identifications of other source nodes and one or more other meta data corresponding to said one or more other source nodes, said second list locally stored at said new node;

subsequent to said receiving said second list, said computer updating said list locally stored at said computer so that said list includes said one or more other identifications of other source nodes and one or more other meta data corresponding to said one or more other source nodes;

subsequent to said updating said list, said computer searching said updated list and in response, detecting said second couple that includes said second identification of said second source node and said second meta data;

said computer identifying said second source node based on said detected second couple that includes said second identification of said second source node;

said computer sending a second request to said identified second source node to retrieve said second asset; and in response to said second request to said identified second source node, said computer receiving said second asset, wherein a result of said receiving said second asset is a sharing of said second asset by said second source node.

2. The method of claim 1, further comprising:

said computer editing said asset via a software-based productivity tool running on said computer, said asset being a computer file, wherein said productivity tool includes a software-based plug-in;

said computer receiving an instruction from said productivity tool to save said computer file, and in response to said receiving said instruction, said computer presenting an option to a user of said productivity tool to share said edited asset;

said computer receiving a selection of said option to share said edited asset; and in response to said receiving said selection of said option, said computer requesting input of said meta data by said user via said plug-in.

3. The method of claim 2, further comprising said computer receiving said ontology that provides a conceptual schema for a plurality of assets to be shared via said peer-to-peer network by mapping said content of said asset into said meta data and mapping content of other assets of said plurality of assets into other meta data, wherein said requesting said input of said meta data is based on said ontology.

4. The method of claim 1, further comprising:

subsequent to said receiving said asset, said computer updating a second list that indicates one or more assets stored locally by said computer, wherein said one or more assets includes said received asset;

said computer sending a notification to said plurality of nodes to publish said meta data and indicate said asset is available for sharing by said computer, wherein a result of said sending said notification to publish said meta data is an update by a second computer of a second list of couples of identifications of source nodes and corresponding meta data with a second couple that includes an identification of said computer and said meta data, wherein said second list is stored locally by said second computer, and wherein said second computer is included in said plurality of nodes;

said computer receiving a request from said second computer to share said asset with said second computer, wherein said request from said second computer to share said asset is based on a search of said second list by said second computer, and in response to said search of said second list, a detection by said second computer of said second couple in said second list stored locally by said second computer;

in response to said receiving said request from said second computer, said computer sending said asset to said second computer; and said computer updating said list by storing said second couple that includes said identification of said computer and said meta data.

5. The method of claim 1, further comprising:

said computer sending a request to said new node for a new subscription for said new node to share assets locally stored at said new node;

subsequent to said sending said request for said new subscription and prior to said receiving said new subscription from said new node, said new node requesting a digital certificate or permission from a user of said new node to allow a sharing of said assets locally stored at said new node;

said new node receiving said requested digital certificate or said permission and subsequently determining a number of peer-to-peer (P2P) connections in said peer-to-peer network does not exceed a predefined threshold amount of connections and determining that no bandwidth degradation exists in said peer-to-peer network;

in response to said receiving said requested digital certificate or said permission, said determining said number of P2P connections does not exceed said predefined threshold amount, and said determining that no bandwidth degradation exists in said peer-to-peer network, said new node transferring said second asset to said computer; and in response to said receiving said requested digital certificate or said permission, said determining said number of P2P connections does not exceed said predefined threshold amount, and said determining that no bandwidth degradation exists in said peer-to-peer network, said new node updating a local list of nodes authorized to receive said assets shared by said new node, wherein said updating said local list of nodes includes adding an identification of said computer.

6. A computer system comprising:

a central processing unit (CPU);

a memory coupled to said CPU;

a computer-readable, tangible storage device coupled to said CPU, said storage device containing instructions that are carried out by said CPU via said memory to implement a method of sharing an asset, said method comprising:

said computer system receiving meta data that specifies properties of an asset to be shared by a source node in a peer-to-peer network and receiving an identification of said source node, said properties including a name of said asset, a description of said asset, a utility of said asset, and a specification of confidentiality of said asset, wherein said computer system and said source node are included in a plurality of nodes of said peer-to-peer network;

said computer system structuring said properties of said asset by an ontology that includes concepts that classify assets including said asset, properties of said concepts, relations between said concepts, instances of said concepts, and a glossary;

based on said received meta data and said properties structured by said ontology, said computer system determining a classification of said asset;

said computer system locally storing said received identification of said source node and said received meta data as a couple in a list residing in a computer data storage device local to said computer system, wherein said list includes identifications of source nodes and meta data corresponding to said source nodes;

subsequent to said locally storing said received identification of said source node and said received meta data, said computer system receiving content specifying said asset and a request to search for and retrieve said asset based on said content;

said computer system loading said list that includes said identifications of source nodes and meta data corresponding to said source nodes;

said computer system searching through said list and in response, said computer system detecting said couple that includes said locally stored identification of said source node and said locally stored meta data, wherein said detecting said couple includes determining a match between said content and said locally stored meta data, said match based on said classification of said asset;

identifying said source node based on said detected couple that includes said locally stored identification of said source node;

sending a request to said identified source node to retrieve said asset;

receiving said asset in response to said request to said identified source node, wherein a result of said receiving said asset is a sharing of said asset by said source node;

said computer system receiving second meta data that specifies properties of a second asset to be shared by a second source node in said peer-to-peer network;

said computer system receiving a second identification of said second source node;

said computer system locally storing said received second identification of said second source node and said received second meta data as a second couple in said list;

subsequent to said locally storing said received second identification of said second source node and said received second meta data, said computer system receiving second content specifying said second asset and a second request to search for and retrieve said second asset based on said second content;

in response to said receiving said second request, said computer system searching said list and in response, determining said second couple is not included in said list;

in response to said determining said second couple is not included in said list, said computer system identifying a new node in said network;

said computer system sending a notification about said new node to a user of said computer system;

said computer system sending a request to said new node for a new subscription for said new node to share assets locally stored at said new node;

subsequent to said sending said request to said new node for a new subscription for said new node to share assets locally stored at said new node, said computer system receiving said new subscription from said new node;

in response to said receiving said new subscription, said computer system receiving from said new node a second list including one or more other identifications of other source nodes and one or more other meta data corresponding to said one or more other source nodes, said second list locally stored at said new node;

subsequent to said receiving said second list, said computer system updating said list locally stored at said computer system so that said list includes said one or more other identifications of other source nodes and one or more other meta data corresponding to said one or more other source nodes;

subsequent to said updating said list, said computer system searching said updated list and in response, detecting said second couple that includes said second identification of said second source node and said second meta data;

said computer system identifying said second source node based on said detected second couple that includes said second identification of said second source node;

said computer system sending a second request to said identified second source node to retrieve said second asset; and in response to said second request to said identified second source node, said computer system receiving said second asset, wherein a result of said receiving said second asset is a sharing of said second asset by said second source node.

7. The computer system of claim 6, wherein said method further comprises:

said computer system editing said asset via a software-based productivity tool running on said computer system, said asset being a computer file, wherein said productivity tool includes a software-based plug-in;

said computer system receiving an instruction from said productivity tool to save said computer file, and in response to said receiving said instruction, said computer system presenting an option to a user of said productivity tool to share said edited asset;

said computer system receiving a selection of said option to share said edited asset; and in response to said receiving said selection of said option, said computer system requesting input of said meta data by said user via said plug-in.

8. The computer system of claim 7, wherein said method further comprises said computer system receiving said ontology that provides a conceptual schema for a plurality of assets to be shared via said peer-to-peer network by mapping said content of said asset into said meta data and mapping content of other assets of said plurality of assets into other meta data, wherein said requesting said input of said meta data is based on said ontology.

9. The computer system of claim 6, wherein said method further comprises:

subsequent to said receiving said asset, said computer system updating a second list that indicates one or more assets stored locally by said computer system, wherein said one or more assets includes said received asset;

said computer system sending a notification to said plurality of nodes to publish said meta data and indicate said asset is available for sharing by said computer system, wherein a result of said sending said notification to publish said meta data is an update by a second computer system of a second list of couples of identifications of source nodes and corresponding meta data with a second couple that includes an identification of said computer system and said meta data, wherein said second list is stored locally by said second computer system, and wherein said second computer system is included in said plurality of nodes;

said computer system receiving a request from said second computer system to share said asset with said second computer system, wherein said request from said second computer system to share said asset is based on a search of said second list by said second computer system, and in response to said search of said second list, a detection by said second computer system of said second couple in said second list stored locally by said second computer system;

in response to said receiving said request from said second computer system, said computer system sending said asset to said second computer system; and said computer system updating said list by storing said second couple that includes said identification of said computer system and said meta data.

10. The computer system of claim 6, wherein said method further comprises:

said computer system sending a request to said new node for a new subscription for said new node to share assets locally stored at said new node;

subsequent to said sending said request for said new subscription and prior to said receiving said new subscription from said new node, said new node requesting a digital certificate or permission from a user of said new node to allow a sharing of said assets locally stored at said new node;

said new node receiving said requested digital certificate or said permission and subsequently determining a number of peer-to-peer (P2P) connections in said peer-to-peer network does not exceed a predefined threshold amount of connections and determining that no bandwidth degradation exists in said peer-to-peer network;

in response to said receiving said requested digital certificate or said permission, said determining said number of P2P connections does not exceed said predefined threshold amount, and said determining that no bandwidth degradation exists in said peer-to-peer network, said new node transferring said second asset to said computer system; and in response to said receiving said requested digital certificate or said permission, said determining said number of P2P connections does not exceed said predefined threshold amount, and said determining that no bandwidth degradation exists in said peer-to-peer network, said new node updating a local list of nodes authorized to receive said assets shared by said new node, wherein said updating said local list of nodes includes adding an identification of said computer system.

11. A computer program product comprising a computer-readable, tangible storage device coupled to a processor of a computer system, said storage device having computer-readable program code stored therein, said computer-readable program code containing instructions that are carried out by said processor to implement a method of sharing an asset, said method comprising:

said computer system receiving meta data that specifies properties of an asset to be shared by a source node in a peer-to-peer network and receiving an identification of said source node, said properties including a name of said asset, a description of said asset, a utility of said asset, and a specification of confidentiality of said asset, wherein said computer system and said source node are included in a plurality of nodes of said peer-to-peer network;

said computer system structuring said properties of said asset by an ontology that includes concepts that classify assets including said asset, properties of said concepts, relations between said concepts, instances of said concepts, and a glossary;

based on said received meta data and said properties structured by said ontology, said computer system determining a classification of said asset;

said computer system locally storing said received identification of said source node and said received meta data as a couple in a list residing in a computer data storage device local to said computer system, wherein said list includes identifications of source nodes and meta data corresponding to said source nodes;

subsequent to said locally storing said received identification of said source node and said received meta data, said computer system receiving content specifying said asset and a request to search for and retrieve said asset based on said content;

said computer system loading said list that includes said identifications of source nodes and meta data corresponding to said source nodes;

said computer system searching through said list and in response, said computer system detecting said couple that includes said locally stored identification of said source node and said locally stored meta data, wherein said detecting said couple includes determining a match between said content and said locally stored meta data, said match based on said classification of said asset;

said computer system identifying said source node based on said detected couple that includes said locally stored identification of said source node;

said computer system sending a request to said identified source node to retrieve said asset;

said computer system receiving said asset in response to said request to said identified source node, wherein a result of said receiving said asset is a sharing of said asset by said source node;

said computer system receiving second meta data that specifies properties of a second asset to be shared by a second source node in said peer-to-peer network;

said computer system receiving a second identification of said second source node;

said computer system locally storing said received second identification of said second source node and said received second meta data as a second couple in said list;

subsequent to said locally storing said received second identification of said second source node and said received second meta data, said computer system receiving second content specifying said second asset and a second request to search for and retrieve said second asset based on said second content;

in response to said receiving said second request, said computer system searching said list and in response, determining said second couple is not included in said list;

in response to said determining said second couple is not included in said list, said computer system identifying a new node in said network;

said computer system sending a notification about said new node to a user of said computer system;

said computer system sending a request to said new node for a new subscription for said new node to share assets locally stored at said new node;

subsequent to said sending said request to said new node for a new subscription for said new node to share assets locally stored at said new node, said computer system receiving said new subscription from said new node;

in response to said receiving said new subscription, said computer system receiving from said new node a second list including one or more other identifications of other source nodes and one or more other meta data corresponding to said one or more other source nodes, said second list locally stored at said new node;

subsequent to said receiving said second list, said computer system updating said list locally stored at said computer system so that said list includes said one or more other identifications of other source nodes and one or more other meta data corresponding to said one or more other source nodes;

subsequent to said updating said list, said computer system searching said updated list and in response, detecting said second couple that includes said second identification of said second source node and said second meta data;

said computer system identifying said second source node based on said detected second couple that includes said second identification of said second source node;

said computer system sending a second request to said identified second source node to retrieve said second asset; and in response to said second request to said identified second source node, said computer system receiving said second asset, wherein a result of said receiving said second asset is a sharing of said second asset by said second source node.

12. The program product of claim 11, wherein said method further comprises:

said computer system editing said asset via a software-based productivity tool running on said computer system, said asset being a computer file, wherein said productivity tool includes a software-based plug-in;

said computer system receiving an instruction from said productivity tool to save said computer file, and in response to said receiving said instruction, said computer system presenting an option to a user of said productivity tool to share said edited asset;

said computer system receiving a selection of said option to share said edited asset; and in response to said receiving said selection of said option, said computer system requesting input of said meta data by said user via said plug-in.

13. The program product of claim 12, wherein said method further comprises receiving said ontology that provides a conceptual schema for a plurality of assets to be shared via said peer-to-peer network by mapping said content of said asset into said meta data and mapping content of other assets of said plurality of assets into other meta data, wherein said requesting said input of said meta data is based on said ontology.

14. The program product of claim 11, wherein said method further comprises:

subsequent to said receiving said asset, said computer system updating a second list that indicates one or more assets stored locally by said computer system, wherein said one or more assets includes said received asset;

said computer system sending a notification to said plurality of nodes to publish said meta data and indicate said asset is available for sharing by said computer system, wherein a result of said sending said notification to publish said meta data is an update by a second computer system of a second list of couples of identifications of source nodes and corresponding meta data with a second couple that includes an identification of said computer system and said meta data, wherein said second list is stored locally by said second computer system, and wherein said second computer system is included in said plurality of nodes;

said computer system receiving a request from said second computer system to share said asset with said second computer system, wherein said request from said second computer system to share said asset is based on a search of said second list by said second computer system, and in response to said search of said second list, a detection by said second computer of said second couple in said second list stored locally by said second computer system;

in response to said receiving said request from said second computer, said computer system sending said asset to said second computer system; and said computer system updating said list by storing said second couple that includes said identification of said computer system and said meta data.

15. The program product of claim 11, wherein said method further comprises:

said computer system sending a request to said new node for a new subscription for said new node to share assets locally stored at said new node;

subsequent to said sending said request for said new subscription and prior to said receiving said new subscription from said new node, said new node requesting a digital certificate or permission from a user of said new node to allow a sharing of said assets locally stored at said new node;

said new node receiving said requested digital certificate or said permission and subsequently determining a number of peer-to-peer (P2P) connections in said peer-to-peer network does not exceed a predefined threshold amount of connections and determining that no bandwidth degradation exists in said peer-to-peer network;

in response to said receiving said requested digital certificate or said permission, said determining said number of P2P connections does not exceed said predefined threshold amount, and said determining that no bandwidth degradation exists in said peer-to-peer network, said new node transferring said second asset to said computer system; and in response to said receiving said requested digital certificate or said permission, said determining said number of P2P connections does not exceed said predefined threshold amount, and said determining that no bandwidth degradation exists in said peer-to-peer network, said new node updating a local list of nodes authorized to receive said assets shared by said new node, wherein said updating said local list of nodes includes adding an identification of said computer system.

16. A process for supporting computing infrastructure, said process comprising providing at least one support service for at least one of creating, integrating, hosting, maintaining, and deploying computer-readable code in a computer comprising a central processing unit (CPU), wherein said CPU carries out instructions contained in said code causing said computer to perform a method of sharing an asset, said method comprising:

said computer receiving meta data that specifies properties of an asset to be shared by a source node in a peer-to-peer network and receiving an identification of said source node, said properties including a name of said asset, a description of said asset, a utility of said asset, and a specification of confidentiality of said asset, wherein said computer and said source node are included in a plurality of nodes of said peer-to-peer network;

said computer structuring said properties of said asset by an ontology that includes concepts that classify assets including said asset, properties of said concepts, relations between said concepts, instances of said concepts, and a glossary;

based on said received meta data and said properties structured by said ontology, said computer determining a classification of said asset;

said computer locally storing said received identification of said source node and said received meta data as a couple in a list residing in a computer data storage device local to said computer, wherein said list includes identifications of source nodes and meta data corresponding to said source nodes;

subsequent to said locally storing said received identification of said source node and said received meta data, said computer receiving content specifying said asset and a request to search for and retrieve said asset based on said content;

said computer loading said list that includes said identifications of source nodes and meta data corresponding to said source nodes;

said computer searching through said list and in response, said computer detecting said couple that includes said locally stored identification of said source node and said locally stored meta data, wherein said detecting said couple includes determining a match between said content and said locally stored meta data, said match based on said classification of said asset;

said computer identifying said source node based on said detected couple that includes said locally stored identification of said source node;

said computer sending a request to said identified source node to retrieve said asset;

said computer receiving said asset in response to said request to said identified source node, wherein a result of said receiving said asset is a sharing of said asset by said source node;

said computer receiving second meta data that specifies properties of a second asset to be shared by a second source node in said peer-to-peer network;

said computer receiving a second identification of said second source node;

said computer locally storing said received second identification of said second source node and said received second meta data as a second couple in said list;

subsequent to said locally storing said received second identification of said second source node and said received second meta data, said computer receiving second content specifying said second asset and a second request to search for and retrieve said second asset based on said second content;

in response to said receiving said second request, said computer searching said list and in response, determining said second couple is not included in said list;

in response to said determining said second couple is not included in said list, said computer identifying a new node in said network;

said computer sending a notification about said new node to a user of said computer;

said computer sending a request to said new node for a new subscription for said new node to share assets locally stored at said new node;

subsequent to said sending said request to said new node for a new subscription for said new node to share assets locally stored at said new node, said computer receiving said new subscription from said new node;

in response to said receiving said new subscription, said computer receiving from said new node a second list including one or more other identifications of other source nodes and one or more other meta data corresponding to said one or more other source nodes, said second list locally stored at said new node;

subsequent to said receiving said second list, said computer updating said list locally stored at said computer so that said list includes said one or more other identifications of other source nodes and one or more other meta data corresponding to said one or more other source nodes;

subsequent to said updating said list, said computer searching said updated list and in response, detecting said second couple that includes said second identification of said second source node and said second meta data;

said computer identifying said second source node based on said detected second couple that includes said second identification of said second source node;

said computer sending a second request to said identified second source node to retrieve said second asset; and in response to said second request to said identified second source node, said computer receiving said second asset, wherein a result of said receiving said second asset is a sharing of said second asset by said second source node.

17. The process of claim 16, wherein said method further comprises:

said computer editing said asset via a software-based productivity tool running on said computer, said asset being a computer file, wherein said productivity tool includes a software-based plug-in;

said computer receiving an instruction from said productivity tool to save said computer file, and in response to said receiving said instruction, said computer presenting an option to a user of said productivity tool to share said edited asset;

said computer receiving a selection of said option to share said edited asset; and in response to said receiving said selection of said option, said computer requesting input of said meta data by said user via said plug-in.

18. The process of claim 17, wherein said method further comprises said computer receiving said ontology that provides a conceptual schema for a plurality of assets to be shared via said peer-to-peer network by mapping said content of said asset into said meta data and mapping content of other assets of said plurality of assets into other meta data, wherein said requesting said input of said meta data is based on said ontology.

19. The process of claim 16, wherein said method further comprises:

subsequent to said receiving said asset, said computer updating a second list that indicates one or more assets stored locally by said computer, wherein said one or more assets includes said received asset;

said computer sending a notification to said plurality of nodes to publish said meta data and indicate said asset is available for sharing by said computer, wherein a result of said sending said notification to publish said meta data is an update by a second computer of a second list of couples of identifications of source nodes and corresponding meta data with a second couple that includes an identification of said computer and said meta data, wherein said second list is stored locally by said second computer, and wherein said second computer is included in said plurality of nodes;

said computer receiving a request from said second computer to share said asset with said second computer, wherein said request from said second computer to share said asset is based on a search of said second list by said second computer, and in response to said search of said second list, a detection by said second computer of said second couple in said second list stored locally by said second computer;

in response to said receiving said request from said second computer, said computer sending said asset to said second computer; and said computer updating said list by storing said second couple that includes said identification of said computer and said meta data.

20. The process of claim 16, wherein said method further comprises:

said computer sending a request to said new node for a new subscription for said new node to share assets locally stored at said new node;

subsequent to said sending said request for said new subscription and prior to said receiving said new subscription from said new node, said new node requesting a digital certificate or permission from a user of said new node to allow a sharing of said assets locally stored at said new node;

said new node receiving said requested digital certificate or said permission and subsequently determining a number of peer-to-peer (P2P) connections in said peer-to-peer network does not exceed a predefined threshold amount of connections and determining that no bandwidth degradation exists in said peer-to-peer network;

in response to said receiving said requested digital certificate or said permission, said determining said number of P2P connections does not exceed said predefined threshold amount, and said determining that no bandwidth degradation exists in said peer-to-peer network, said new node transferring said second asset to said computer; and in response to said receiving said requested digital certificate or said permission, said determining said number of P2P connections does not exceed said predefined threshold amount, and said determining that no bandwidth degradation exists in said peer-to-peer network, said new node updating a local list of nodes authorized to receive said assets shared by said new node, wherein said updating said local list of nodes includes adding an identification of said computer.

\* \* \* \* \*